US011934397B2

(12) United States Patent
Korlapati et al.

(10) Patent No.: US 11,934,397 B2
(45) Date of Patent: Mar. 19, 2024

(54) QUERY PLAN OVERRIDES

(71) Applicant: salesforce.com, inc., San Francisco, CA (US)

(72) Inventors: Rama Krishna Korlapati, El Segundo, CA (US); William J. McKenna, Boulder, CO (US); John Francis O'Brien, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 206 days.

(21) Appl. No.: 16/778,938

(22) Filed: Jan. 31, 2020

(65) Prior Publication Data
US 2021/0240710 A1 Aug. 5, 2021

(51) Int. Cl.
*G06F 16/2453* (2019.01)
*G06F 11/34* (2006.01)
*G06F 16/2452* (2019.01)

(52) U.S. Cl.
CPC .... *G06F 16/24544* (2019.01); *G06F 11/3409* (2013.01); *G06F 16/24526* (2019.01)

(58) Field of Classification Search
CPC ........... G06F 16/24544; G06F 11/3409; G06F 16/24526; G06F 16/24537
See application file for complete search history.

(56) References Cited

U.S. PATENT DOCUMENTS

| | | | |
|---|---|---|---|
| 6,813,617 B2 | 11/2004 | Wong et al. | |
| 7,685,101 B2 | 3/2010 | Day et al. | |
| 8,190,595 B2 | 5/2012 | Bruno et al. | |
| 2005/0065925 A1* | 3/2005 | Weissman | G06F 16/2453 |
| 2007/0233641 A1* | 10/2007 | Chong | G06F 16/367 |
| 2008/0281779 A1* | 11/2008 | Day | G06F 16/24547 |
| 2010/0250518 A1 | 9/2010 | Bruno et al. | |

(Continued)

OTHER PUBLICATIONS

Rocha et al., "Efficient execution plans for distributed skyline query processing," EDBT/ICDT '11: Proceedings of the 14th International Conference on Extending Database Technology Mar. 2011, pp. 271-282 https://doi.org/10.1145/1951365.1951399 (Year: 2011).*

(Continued)

*Primary Examiner* — Mark D Featherstone
*Assistant Examiner* — Kweku William Halm
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to database query optimizers. In some embodiments, a query parser of a database system receives a query requesting data from a multi-tenant database. The query includes a first constraint that restricts a query optimizer's selection of a set of execution plans available to implement the query. The database system determines whether an override has been specified for a particular tenant associated with the received query, the override indicating that the first constraint is to be replaced with a second constraint for the particular tenant. In response to determining that the override has been specified for the particular tenant, the database system replaces the first constraint in the query with the second constraint and provides the query with the second constraint to the query optimizer for selection of an execution plan in accordance with the second constraint.

20 Claims, 15 Drawing Sheets

(56) References Cited

U.S. PATENT DOCUMENTS

| | | | |
|---|---|---|---|
| 2011/0082854 A1* | 4/2011 | Eidson | G06F 16/2453 |
| | | | 707/E17.017 |
| 2011/0282864 A1* | 11/2011 | Collins | G06F 16/24532 |
| | | | 707/719 |
| 2013/0246450 A1* | 9/2013 | Weissman | G06F 16/2453 |
| | | | 707/765 |
| 2015/0149435 A1* | 5/2015 | McKenna | G06F 16/24544 |
| | | | 707/714 |
| 2016/0253385 A1 | 9/2016 | Thombre et al. | |
| 2019/0146830 A1* | 5/2019 | Gerber | G06N 20/00 |
| | | | 718/101 |
| 2019/0236188 A1* | 8/2019 | McKenna | G06F 16/24565 |
| 2020/0334375 A1* | 10/2020 | Turgeman | G06F 16/2452 |

OTHER PUBLICATIONS

17 Optimizer Hints, Oracle Database Performance Tuning Guide, 10g Release 1 (10.1), Part No. B10752-01; https://docs.oracle.com/cd/B12037_01/server.101/b10752/hintsref.htm; 38 pages. [Retrieved Jan. 31, 2018].

Nicolas Bruno et al., "Power Hints for Query Optimization," 2009 IEEE 25th International Conference on Data Engineering, Mar. 29-Apr. 2, 2009, 12 pages.

\* cited by examiner

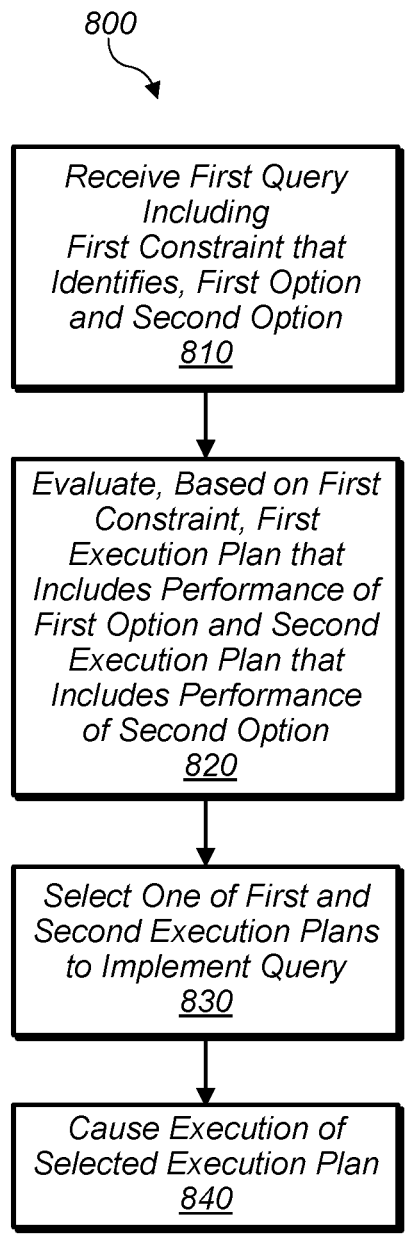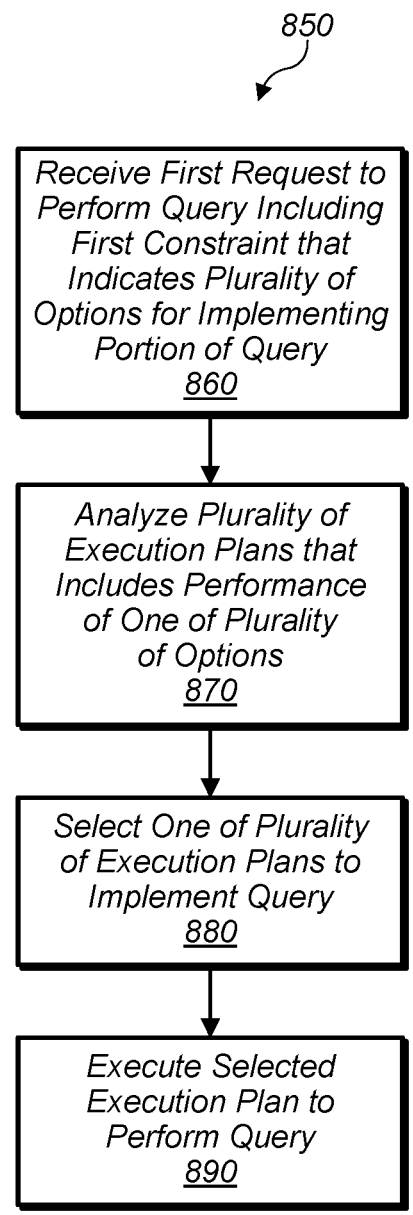
FIG. 8A
FIG. 8B

QUERY PLAN OVERRIDES

BACKGROUND

Technical Field

This disclosure relates generally to database systems, and, more specifically, to database query optimizers.

Description of the Related Art

When a query is submitted to a database, it may express what the result of a query should be, but not how to obtain the result. As such, it may be possible to execute a query using several different approaches. For example, a query requesting a join of tables A, B, and C may be executed as 1) a join of A and B followed by a join of the result and C or 2) a join of B and C followed by a join of A and the result. Modern relational database systems typically employ a query optimizer that receives a parsed query and evaluates different execution plans to determine a plan for executing a query. This evaluation may include determining scores for each plan based on estimated computational and storage costs and selecting the plan with the best score. Accordingly, a query optimizer might provide a better score to the second plan noted above if the result of joining B and C produced a smaller temporary table than the result of joining A and B.

BRIEF DESCRIPTION OF THE DRAWINGS

FIGS. 8A and 8B are flow diagrams illustrating embodiments of methods for servicing database queries.

13A-13C are flow diagrams illustrating embodiments of methods associated with query plan overrides.

Figure 14:
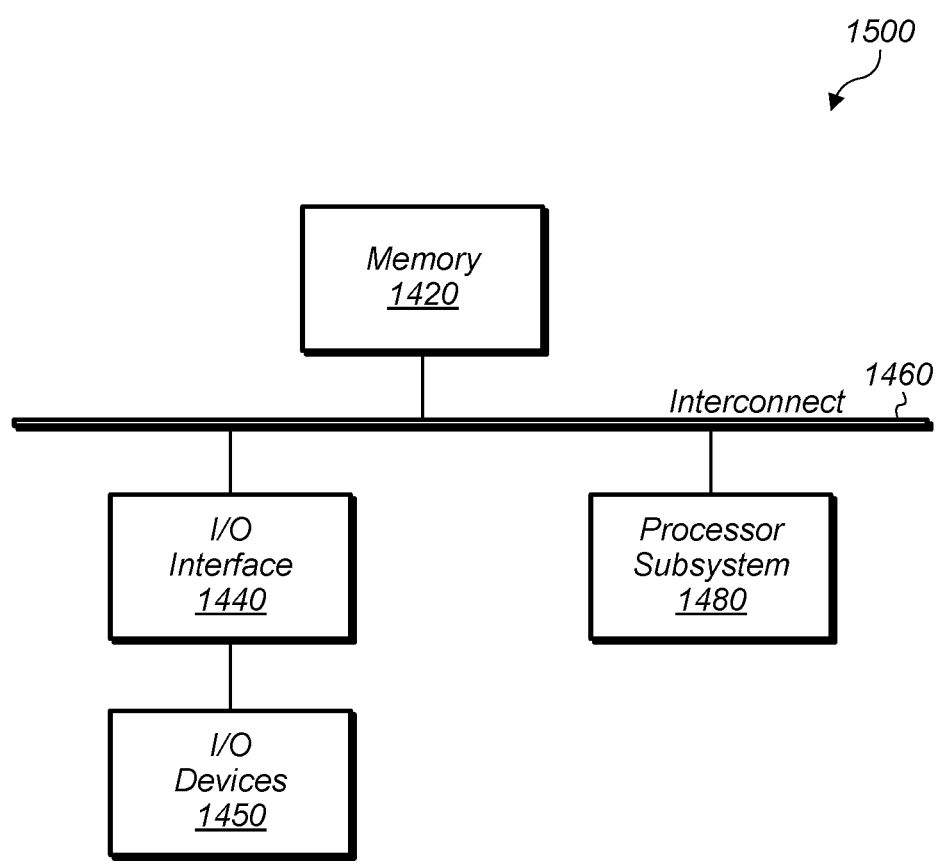

FIG. 14 is a block diagram illustrating one embodiment of an exemplary computer system.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "database system configured to store data in a table" is intended to cover, for example, a computer system having one or more processors and memory having program instructions to perform this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, if a database system receives a first request and a second request, these requests can be received in any ordering. In other words, the "first" request is not limited to an initial request, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure begins, in conjunction with FIGS. 1-8, describing query optimizer constraints, which may be included in a database query to restrict a query optimizer's selection of execution plans available to implement the query (e.g., to improve a query's performance). The present disclosure then presents, with FIGS. 9-13C, a discussion of query plan overrides, which may be to used override a query optimizer's selection of particular execution plans based on particular query optimizer constraints (e.g., when the selected execution plans produce undesirable results). An exemplary computer system, which may be used to implement functionality described herein, is lastly discussed in conjunction with FIG. 14.

Query Optimizer Constraints

Query optimizers may not always select the most desirable execution plan for a given query. This may be attributable to the fact that various cost metrics assessed by a query optimizer may include incorrect information. For example, statistics maintained for a given table (or column) may be stale or missing. It may also be difficult to accurately estimate the cost of complex queries that include multiple predicates. In contrast, a user (or an application) may have greater insight into the data stored in a database as well as the queries being submitted. Still further, a user may be able to determine that the execution plans being selected by a query optimizer for particular queries are underperforming and can be improved. As such, a query optimizer may benefit from this additional insight.

The present disclosure describes embodiments in which a query optimizer of a database system is operable to receive directives (referred to below as query optimizer constraints) that restrict the set of execution plans being considered to implement a given query. As will be described below, a query may be submitted that includes one or more embedded constraints. These constraints may then be provided to a query optimizer that evaluates various execution plans for the query and attempts to select a plan that complies with the constraints. For example, a query may include a constraint instructing the optimizer to select a plan that includes a particular type of scan, join, etc.—thus, a user may prevent a query optimizer from selecting a plan including a problematic join operation, for example. As will also be discussed, in various embodiments, the query optimizer can receive a constraint that identifies multiple options for implementing a clause/portion of a query. The query optimizer can then evaluate execution plans pertaining to the options and select a plan that includes one of the options. For example, a constraint may be submitted that indicates a particular scan should be performed using one or two of potential indexes identified in the constraint. The query optimizer may then evaluate plans that include scans using the first index and plans that include scans using the second index, and select one of the plans based on its evaluation. Thus, a user may be able to restrict what plans are being considered by the query optimizer, but still leverage the intelligence of the query optimizer to select between multiple favorable options. In various embodiments, if the query optimizer is unable to identify a plan that satisfies that the constraints in a given query, the query optimizer may still provide an indication of why it was unable to satisfy the constraints—in some embodiments, the query optimizer may even still select a noncompliant plan and have the plan executed, so that the query is still serviced.

Figure 1:
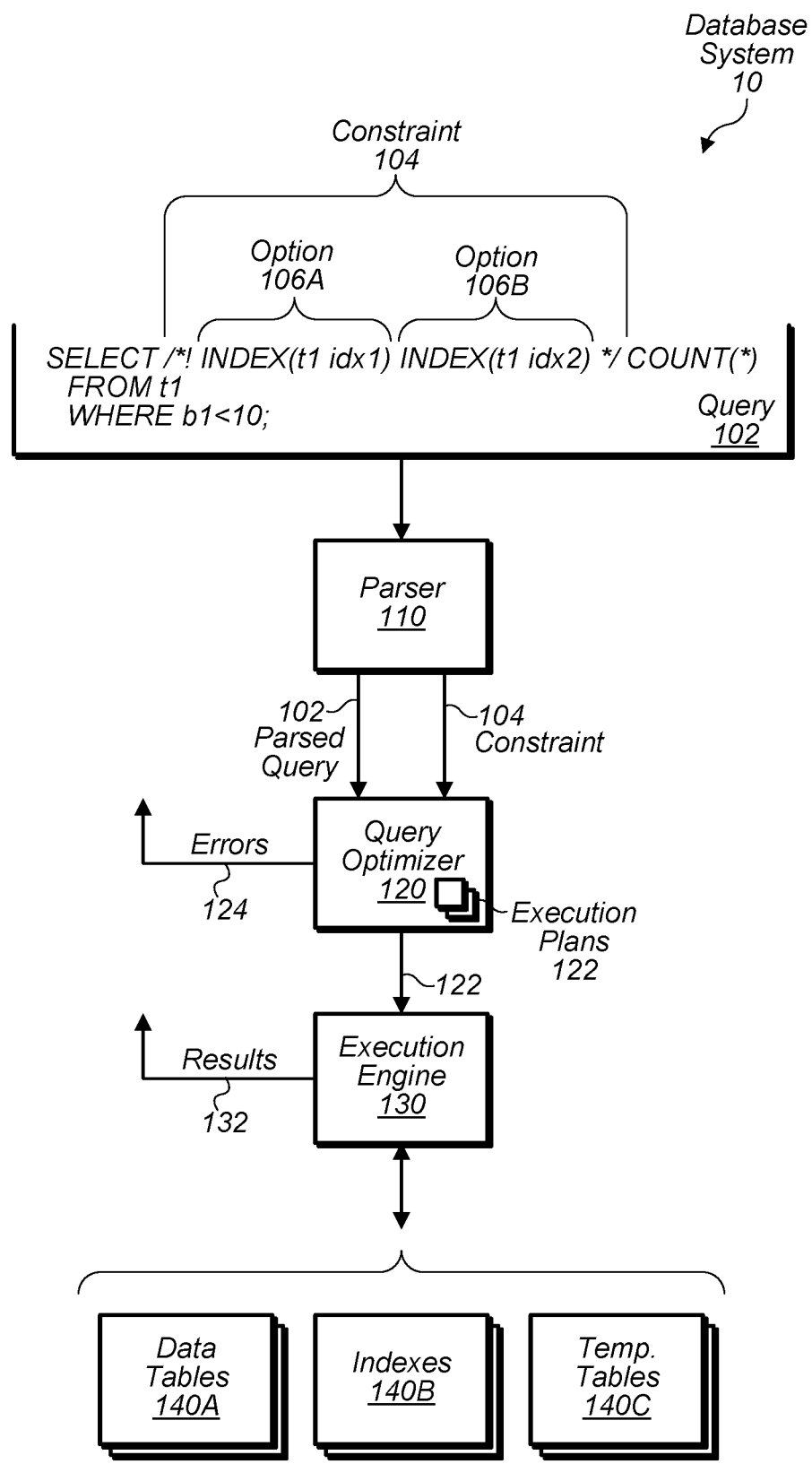
FIG. 1 is a block diagram illustrating one embodiment of a database system configured to support query optimizer constraints.

Turning now to FIG. 1, a block diagram of a database system 10 configured to support queries 102 having query optimizer constraints 104 is depicted. In illustrated embodiment, database system 10 includes a parser 110, query optimizer 120, execution engine 130, and tables 140. In some embodiments, database system 10 may be implemented differently than shown. For example, system 10 may include more components, queries 102 may be expressed using a different syntax, etc.

Database system 10 may correspond to any suitable database system. In some embodiments, system 10 is a relational database management system (RDBMS), which may be implemented using, for example, Oracle™, MySQL™, Microsoft™ SQL Server, PostgreSQL™ IBM™ DB2, etc. Accordingly, system 10 may be configured to store data in one or more data tables 140A for servicing queries 102. System 10 may also maintain one or more indexes 140B usable to facilitate retrieving data from data tables 140A, and may generate temporary tables 140C in response to servicing queries 102. In the illustrated embodiment, queries 102 are expressed using structured query language (SQL); in other embodiments, other query declarative languages may be supported. In some embodiments, database system 10 may include a multi-tenant database in which multiple tenants may each store a respective set of data in the database. For example, the multi-tenant database may include a first set of data belonging to a non-profit organization (e.g., a first tenant) and a set of data belonging to a company (e.g., a second tenant). In such an embodiment, database system 10 may employ various security measures to ensure that one tenant's data set is isolated from another's data set in order to prevent one tenant from accessing another tenant's data.

Parser 110, in various embodiments, is operable to parse a submitted query 102, which may include one or more constraints 104. In some embodiments, this parsing may include performing a syntax analysis of the clauses within a query 102 and assembling a data structure (e.g., an expression tree) that can be processed by query optimizer 120. Parser 110 may also separate any constraints 104 from the query 102. In the illustrated embodiment of FIG. 1, parser 110 identifies a constraint 104 based on the presence of the delimiter/*! . . . */, where . . . is the content of the constraint. In other embodiments, different delimiters (or even techniques) may be used to distinguish a constraint 104 from other content in query 102. As will be described with respect to FIG. 7, in some embodiments, parser 110 may also attempt to flatten queries 102 if they include subqueries. This flattening may include merging a query and a subquery into a single query as well as merging together constraints 104 if multiple constraints 104 have been specified for the query and its subquery.

Query optimizer 120, in various embodiments, is operable to generate an execution plan 122 for a given query 102, which includes evaluating various execution plans 122 and selecting one to implement the query 102. Optimizer 120 may use any suitable algorithm to evaluate and select plans 122. In some embodiments, optimizer 120 may use a heuristic algorithm in which execution plans 122 are assessed based on a set of rules provided to optimizer 120. In other embodiments, optimizer 120 uses a cost-based algorithm in which optimizer 120 performs a cost analysis that includes assigning scores to execution plans 122 based on an estimated processor consumption, an estimated memory consumption, an estimated execution time, etc. These estimates may further be based on various metrics such as the number of distinct values in table columns, the selectivity of predicates (the fraction of rows the predicate would qualify), the cardinalities (e.g., row counts) of tables 140A being accessed as will be discussed with respect to FIG. 6, etc. Based on the scores, optimize 120 may then select an execution plan 122 that has the best score. In still other embodiments, optimizer 120 may use a combination of heuristic and cost-based algorithms.

As discussed above, in various embodiments, query optimizer 120 is further operable to evaluate execution plans 122 based on constraints 104 included in a query 102 and select plans 122 that comply with constraints 104. For example, in some embodiment, a query optimizer 120 may assign an unfavorable score to (or may not even score) any execution plan 122 that does not comply with constraints 104 in order to preclude it from being selected. As noted above and shown in FIG. 1, in various embodiments, a given constraint 104 may specify multiple options 106 for an acceptable execution plan 122. For example, as will be described below with respect to FIG. 2, the constraint 104 depicted in FIG. 1 instructs optimizer 120 to select a plan 122 that includes an index scan using index idx1 (depicted as option 106A) or an index scan using index idx2 (depicted as option 106B) in order to implement query 102. (Although two options 106A and 106B are depicted in FIG. 1 and some subsequent Figs., any number of options 106 may be specified in various embodiments.) Thus, optimizer 120 may consider, for selection, plans 122 that include option 106A and plans 122 that include option 106B, but not consider any plans 122 that do not possess either of options 106A and 106B (e.g., a plan 122 that does not include an index scan). Various examples of constraints 104 will be discussed in greater detail below with respect to FIGS. 2-6. These constraints 104 may, for example, include constraints that restrict how scans are performed, restrict how joins are performed, override metrics assessed by optimizer 120, etc.

In various embodiments, if query optimizer 120 is unable to select an execution plan 122 that satisfies the constraints 104 for a given query 102, query optimizer 120 is operable to provide a corresponding indication shown as an error 124 in FIG. 1. In some embodiments, this error 124 may indicate not only that a plan 122 does not exist to satisfy constraints 104, but also identify the particular constraint 104 that could not be satisfied if multiple constraints 104 were specified in the query 102. In some embodiments, query optimizer 120 may still select an execution plan 122 (albeit one that does not comply with constraints 104) and provide it to plan execution engine 130—thus, a user may still receive results 132, but be made aware that the results 132 were obtained in a manner that is inconsistent with the provided constraints 104. In other embodiments, however, query optimizer 120 may provide an error 124 and not select any plan 122 to implement the query 102.

Once an execution plan 122 has been selected, execution engine 130, in various embodiments, is operable to execute the selected plan 122. Accordingly, engine 130 may perform the various actions listed in the plan 122, which may include accessing one or more data tables 140A, indexes 140B, and/or temporary tables 140C. Engine 130 may then return any results 132 to service query 102.

Figure 2:
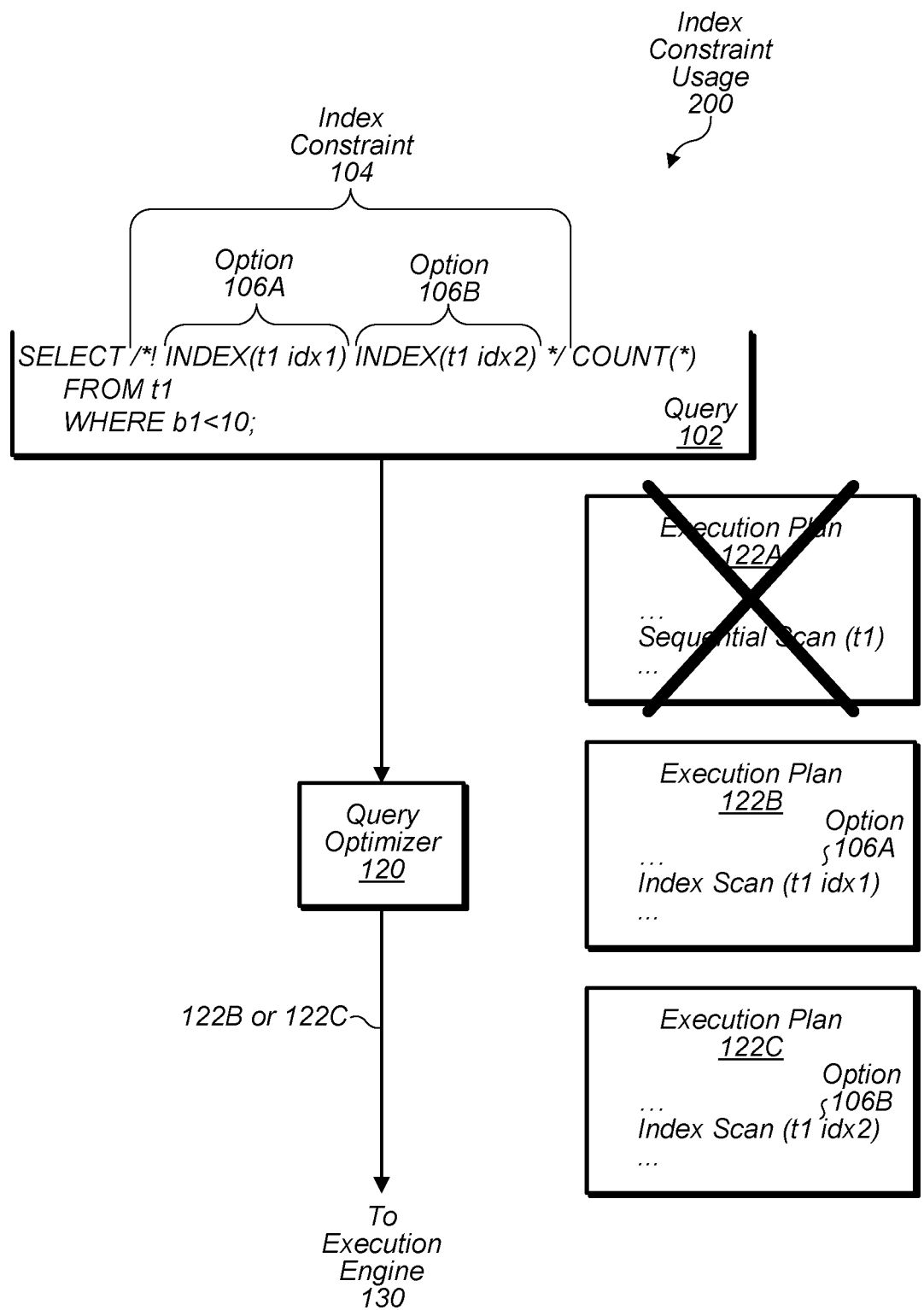
FIG. 2 is a block diagram illustrating one embodiment of an index constraint.

Turning now to FIG. 2, a block diagram of an index constraint usage 200 is depicted. As shown, database system 10 may receive a request for a query 102 that selects, from a table, content that satisfies one or more criteria. In the particular query 102 depicted in FIG. 2, a request is made to select rows from table t1 that have a value in column b1 less than 10, and to count the number of selected rows. When such a query 102 is received, database system 10 may support multiple types of scan operations for identifying rows that meet the specified criteria. For example, database system 10 may support a sequential scan in which execution engine 130 walks row by row examining each value in column b1 and determining whether it is less than 10.

Database system 10 may also support an index scan in which an index is referenced to identify particular rows of interested. For example, an index 140B may exist that maps a given value to each row having that value in column b1. Accordingly, using index scan based on this index may be more efficient as rows having, for example, the values of 9, 8, 7, and so forth can be identified using the index without having to consider rows having values greater than 10.

In the illustrated embodiment, query optimizer 120 supports an index constraint 104 that instructs query optimizer 120 to select a plan 122 that includes one of multiple options 106 for index scans. In the specific example depicted in FIG. 2, option 106A "INDEX (t1 idx1)" indicates that an index scan using table t1 's index idx1 would be acceptable. Option 106B "INDEX (t2 idx2)" indicates that an index scan using table t1' s index idx2 would also be acceptable. Accordingly, based on these two options 106A and 106B, query optimizer 120 may not consider an execution plan 122A including a sequential scan t1, and instead evaluates an execution plan 122B including option 106A and an execution plan 122C having option 106B. Based on this evaluation, optimizer 120 then selects a preferred one of plans 122B and 122C for execution by execution engine 130.

Figure 3:
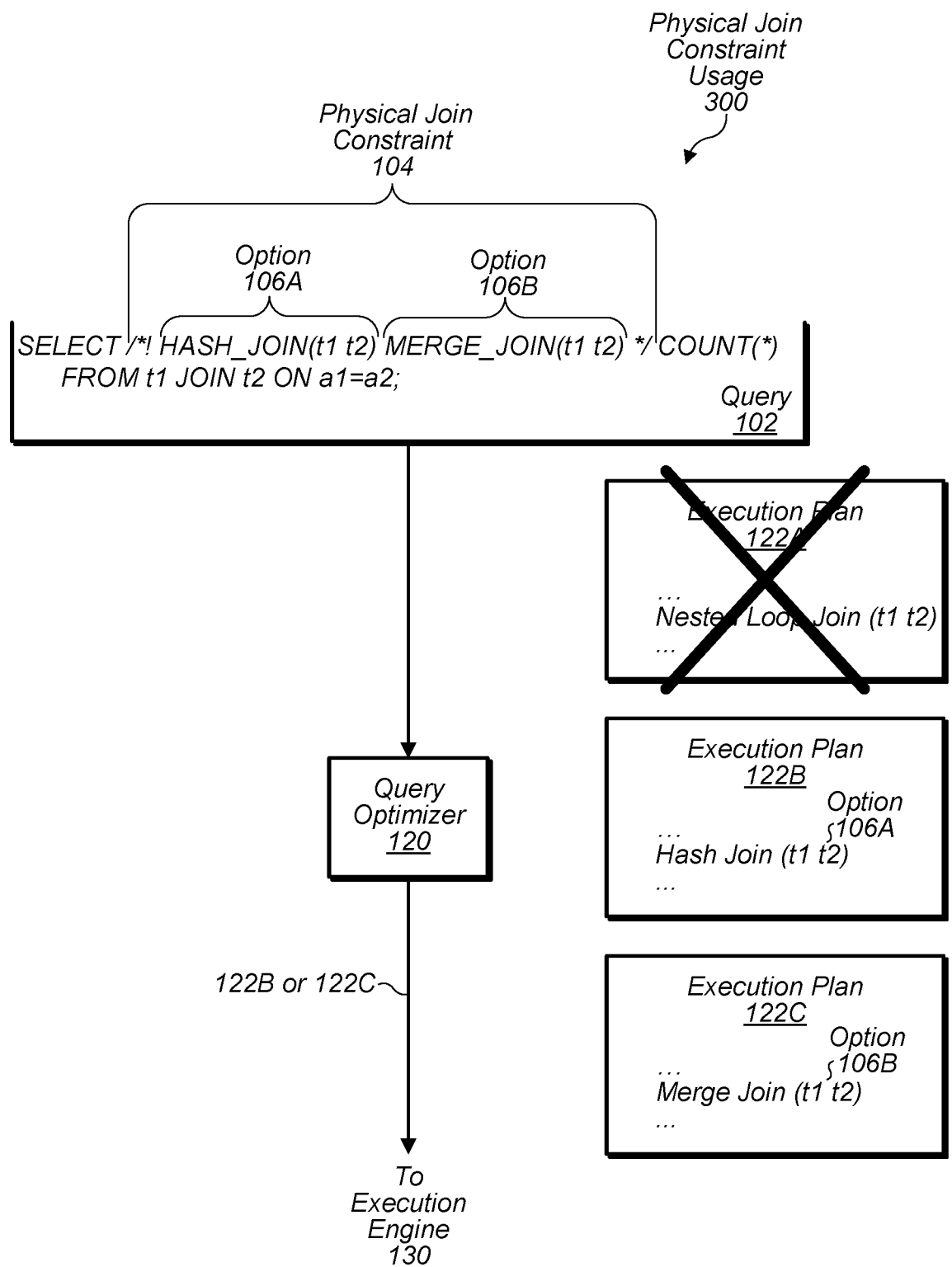
FIG. 3 is a block diagram illustrating one embodiment of a physical join constraint.

Turning now to FIG. 3, a block diagram of a physical join constraint usage 300 is depicted. As shown, a query 102 may be received that requests the joining of content from two or more tables. In the particular query 102 depicted in FIG. 3, a request is made to join together rows of table t1 and t2 if a value in column a1 of t1 matches a value in column a2 of t2.

The expression of a join in a query may be referred to herein as a "logical join." A logical join stands in contrast to a "physical join," which is the operation performed by execution engine 130 to implement the logical join. In various embodiments, database system 10 supports multiple types of physical joins such as a "nested loop join," "hash join," and "merge join." As used herein, the phase "nested loop join" is to be interpreted in accordance with its ordinary and established meaning, which includes a join in which each element in the right relation (or left relation) is scanned once for every row found in the left relation (or right relation). For example, each value in column a1 would be scanned against every value in column a2. As used herein, the phrase "hash join" is to be interpreted in accordance with its ordinary and established meaning, which includes a join in which 1) the right relation (or left relation) is first scanned and loaded into a hash table, using its join attributes as hash keys and 2) the left relation (or right relation) is scanned and the appropriate values of every row found are used as hash keys to locate the matching rows in the table. As used herein, the phrase "merge join" is to be interpreted in accordance with its ordinary and established meaning, which includes a join in which 1) each relation is sorted on the join attributes before the join starts, 2) the two relations are scanned in parallel, and 3) matching rows are combined to form join rows.

In the illustrated embodiment, query optimizer 120 supports a physical join constraint 104 that instructs query optimizer 120 to select a plan 122 that includes one of multiple types of physical joins indicated by options 106. In the specific example depicted in FIG. 3, option 106A "HASH_JOIN (t1 t2)" indicates a desire for a hash join of tables t1 and t2. Option 106B "MERGE_JOIN (t1 t2)" indicates a desire for a merge join of tables t1 and t2. Accordingly, based on these two options 106A and 106B, query optimizer 120 may not consider an execution plan 122A including a nested loop join of tables t1 and t2, and instead evaluates an execution plan 122B including a hash join corresponding to option 106A and an execution plan 122C including a merge join corresponding to option 106B. Based on this evaluation, optimizer 120 then selects a preferred one of plans 122B and 122C for execution by execution engine 130.

Figure 4:
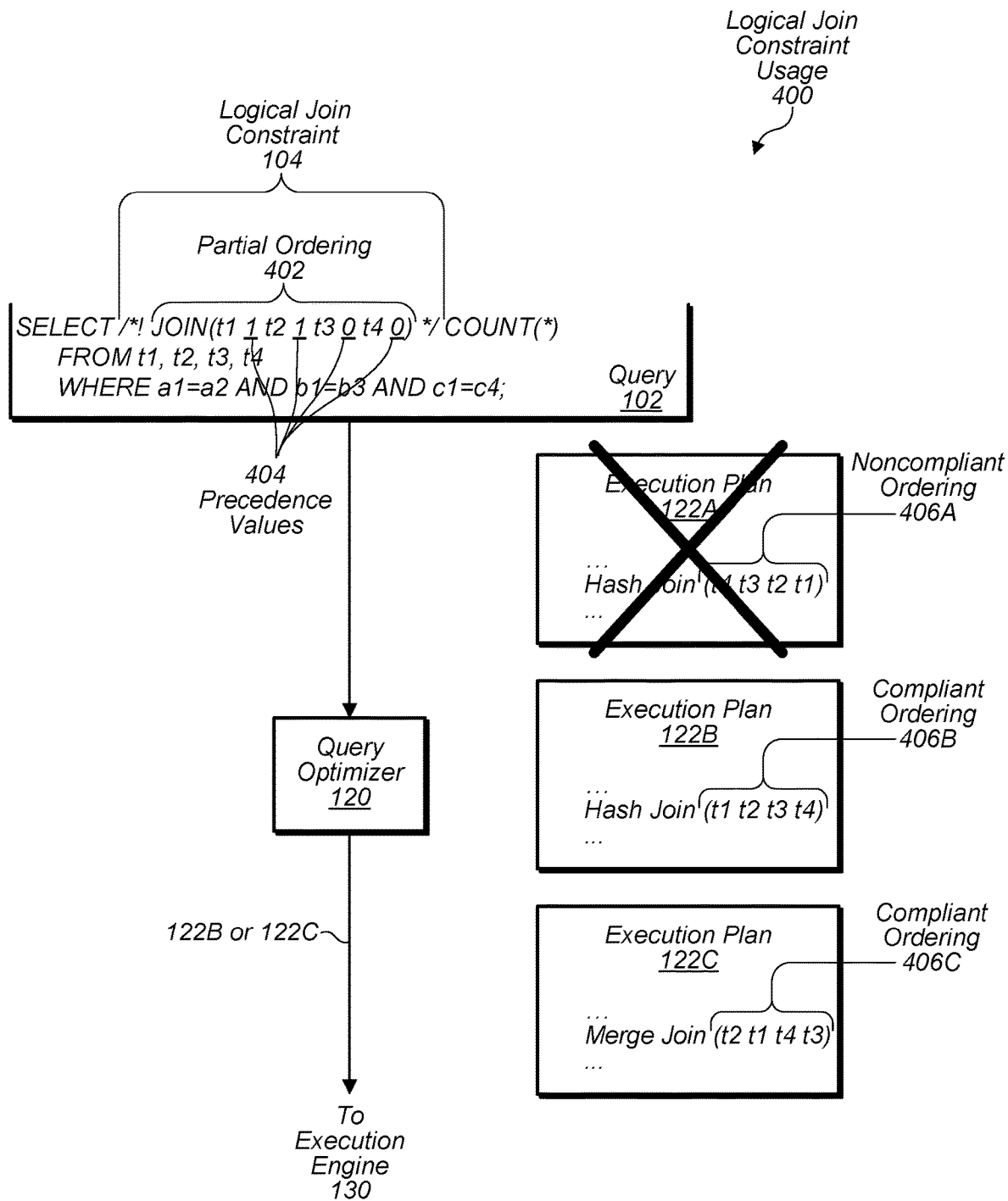
FIG. 4 is a block diagram illustrating one embodiment of a logical join constraint.

Turning now to FIG. 4, a block diagram of a logical join constraint usage 400 is depicted. As discussed above in the background, a join between three or more tables may be implemented using multiple different orderings. In some embodiments, query optimizer 120 supports a logical constraint 104 in which a partial ordering 402 can be expressed to optimizer 120 without expressing the entire ordering for joining tables—thus allowing optimizer to choose between multiple ordering options.

In the illustrated embodiment, partial ordering 402 is expressed using a grammar in which precedence values 404 are assigned to tables being joined. (In other embodiments, different grammars may be used to express partial orderings 402.) For example, as shown, tables t1 and t2 are assigned a precedence value of 1 while tables are assigned a precedence value 0. In some embodiments, tables assigned a greater precedence value are performed earlier; however, tables assigned the same value may be performed in any ordering. According, in such an embodiment, tables t1 and t2 having the value 1 are to be ordered earlier in the join than tables t3 and t4 having the value 0; however, either table t1 or table t2 may be the initial table in the ordering. Thus, the ordering 406B of t1, t2, t3, and t4 and the ordering 406C of t2, t1, t4, t3 are compliant with partial ordering 402 depicted in FIG. 4. The ordering 406A of t4, t3, t2, and t1, however, is not compliant as tables t4 and t3 have a lower precedence value than the precedence value of tables t1 and t2, in this example. As a result, query optimizer 120 may not consider an execution plan 122A having a noncompliant ordering 406A, and evaluate only those plans 122B and plans 122C having compliant orderings 406B and 406C.

Figure 5:
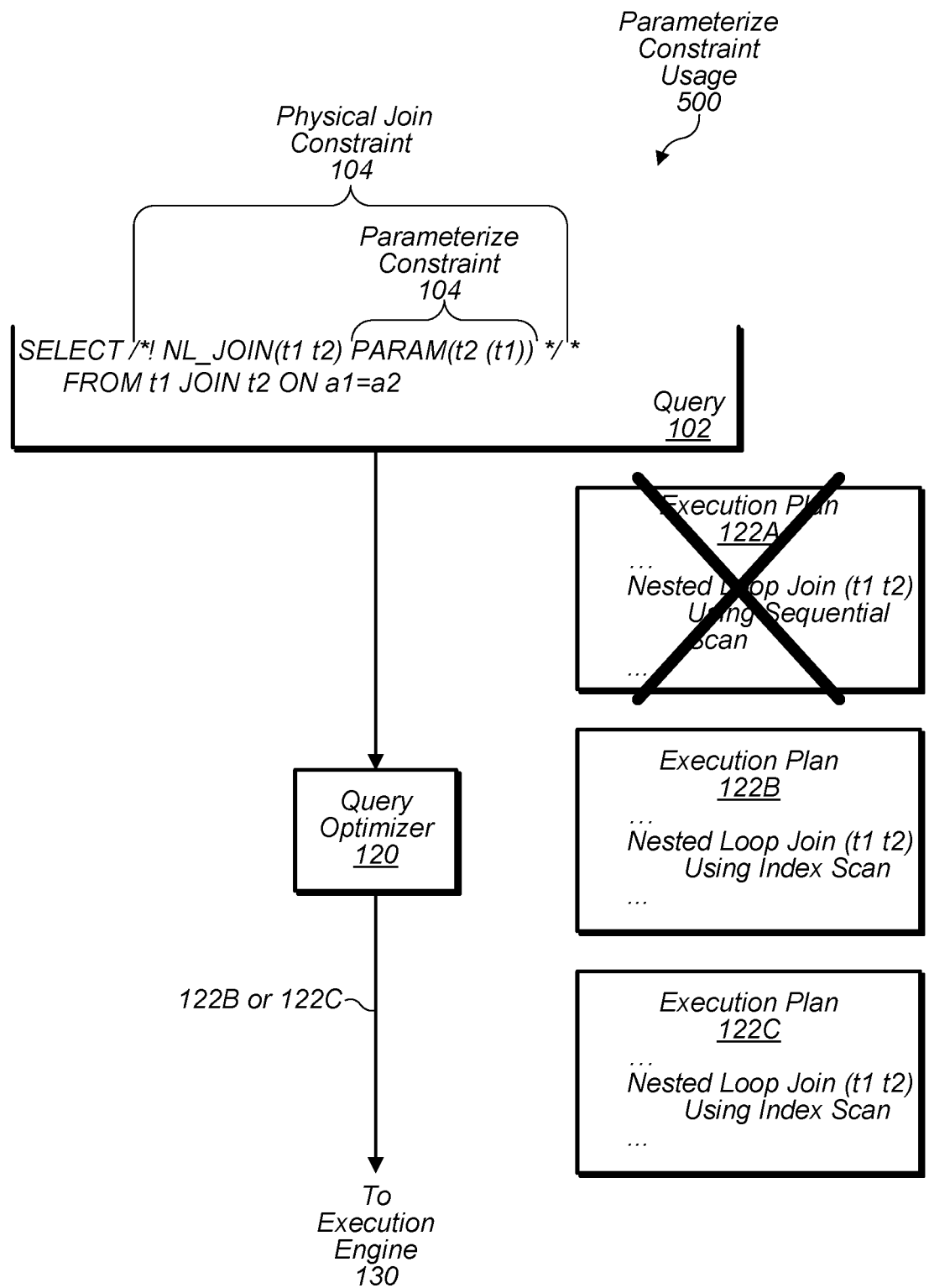
FIG. 5 is a block diagram illustrating one embodiment of a parameterize constraint.

Turning now to FIG. 5, a block diagram of a parameterize constraint usage 500 is depicted. As noted above with FIG. 3, a query 102 may include physical join constraint 104 indicating the type of physical join to be used to implement a join specified in the query 102. In instances in which a nested loop join is specified, the nested loop join may be implemented using a sequential scan or an index scan.

In some embodiments, query optimizer 120 supports a parameterize constraint 104 to indicate that index scan is to be used. In the specific example depicted in FIG. 5, "PARAM(t2 (t1))" indicates that the values of t1 are to be parameterized and supplied to an index for t2 to identify the corresponding rows of the join. For example, suppose t1 has the values 1, 2, and 3 for a1. When the index scan is performed, t1 is scanned such that the value 1 for a1 becomes the index scan predicate input into the index of t2 for column a2. The matching rows are then formed and output by the nested loop join. This process is then repeated for the a1 values 2 and 3. Because the values are substituted in the predicate on the index scan this type of plan is referred to as a parameterized plan.

Figure 6:
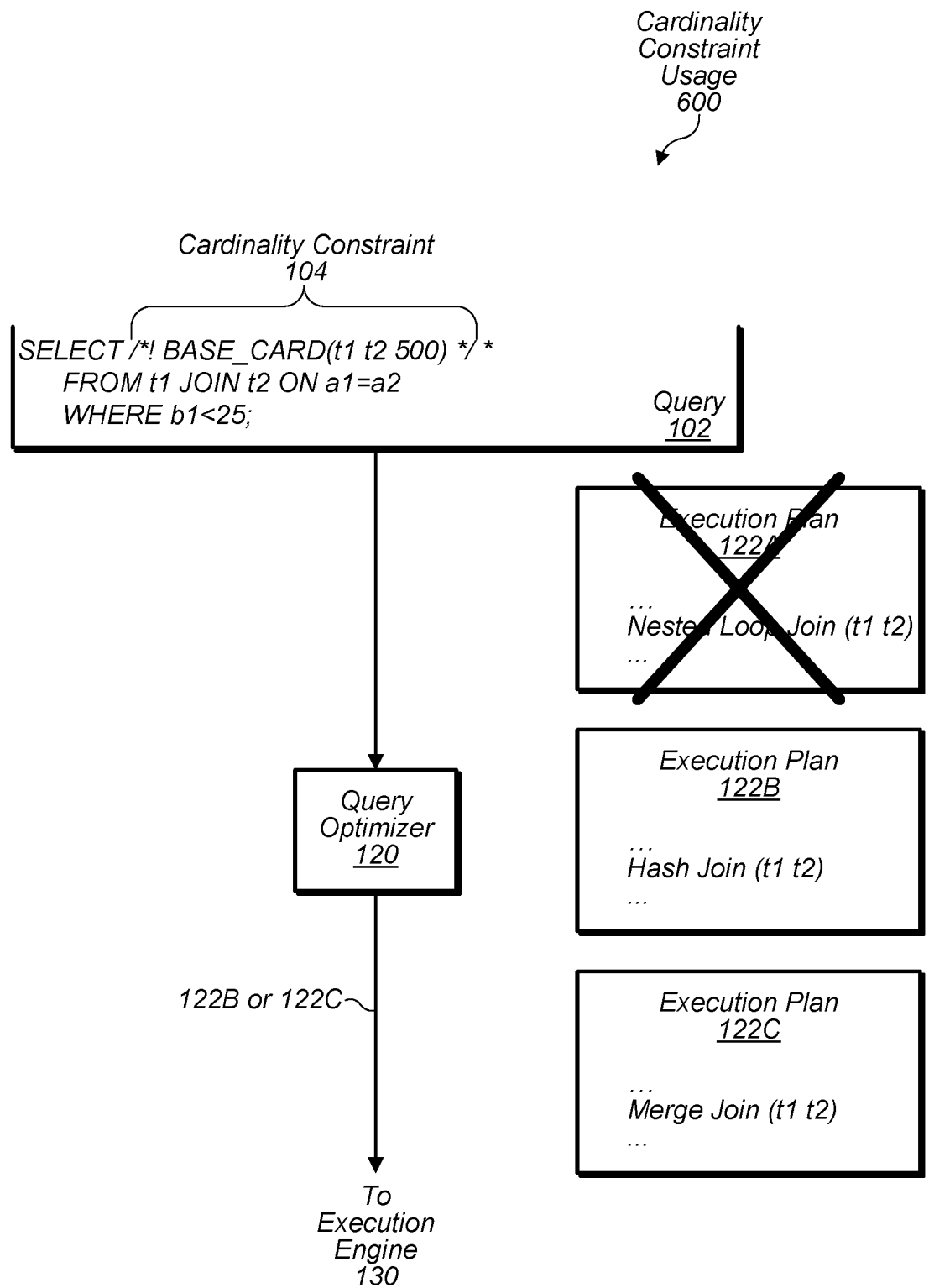
FIG. 6 is a block diagram illustrating one embodiment of a cardinality constraint.

Turning now to FIG. 6, a block diagram of a cardinality constraint usage 600 is depicted. As noted above, the cardinality of a table 140 (i.e., the size of a table) may affect query optimizer 120's evaluation of various execution plans 122A. In some embodiments, the cardinality of a table can be expressed to the optimizer 120 by providing a cardinality constraint 104 in a query 102 (as opposed to having optimizer 120 read the cardinality from a database catalog). For example, as shown in FIG. 6, the cardinality constraint 104 "BASE_CARD(t1 t2 500)" indicates that tables t1 and t2 include 500 rows. Notably, in the illustrated embodiment, the same constraint 104 is used to specify cardinalities for multiple tables being accessed for the query 102. Based on this information, query optimizer 120 may determine to not consider an execution plan 122A in which a nested loop join is performed if the 99 rows are sufficiently large enough, in this example, to make the nested loop join undesirable. Instead, query optimizer 120 may select execution plan 122B including a hash join or execution plan 122C including a merge join as these physical joins may be more efficient for the size of table t1. In some embodiments, query optimizer 120 also supports a cardinality constraint 104 that indicates the cardinality of a table generated as a result of query 102. For example, in the query 102 depicted in FIG. 6, inclusion of the constraint 104 "CARD(t1 99)" may indicate to optimizer 120 that the table generated from the join of t1 and t2 is to have 99 rows. Based on this information, optimizer 120 may choose a different execution plan 122.

Figure 7:
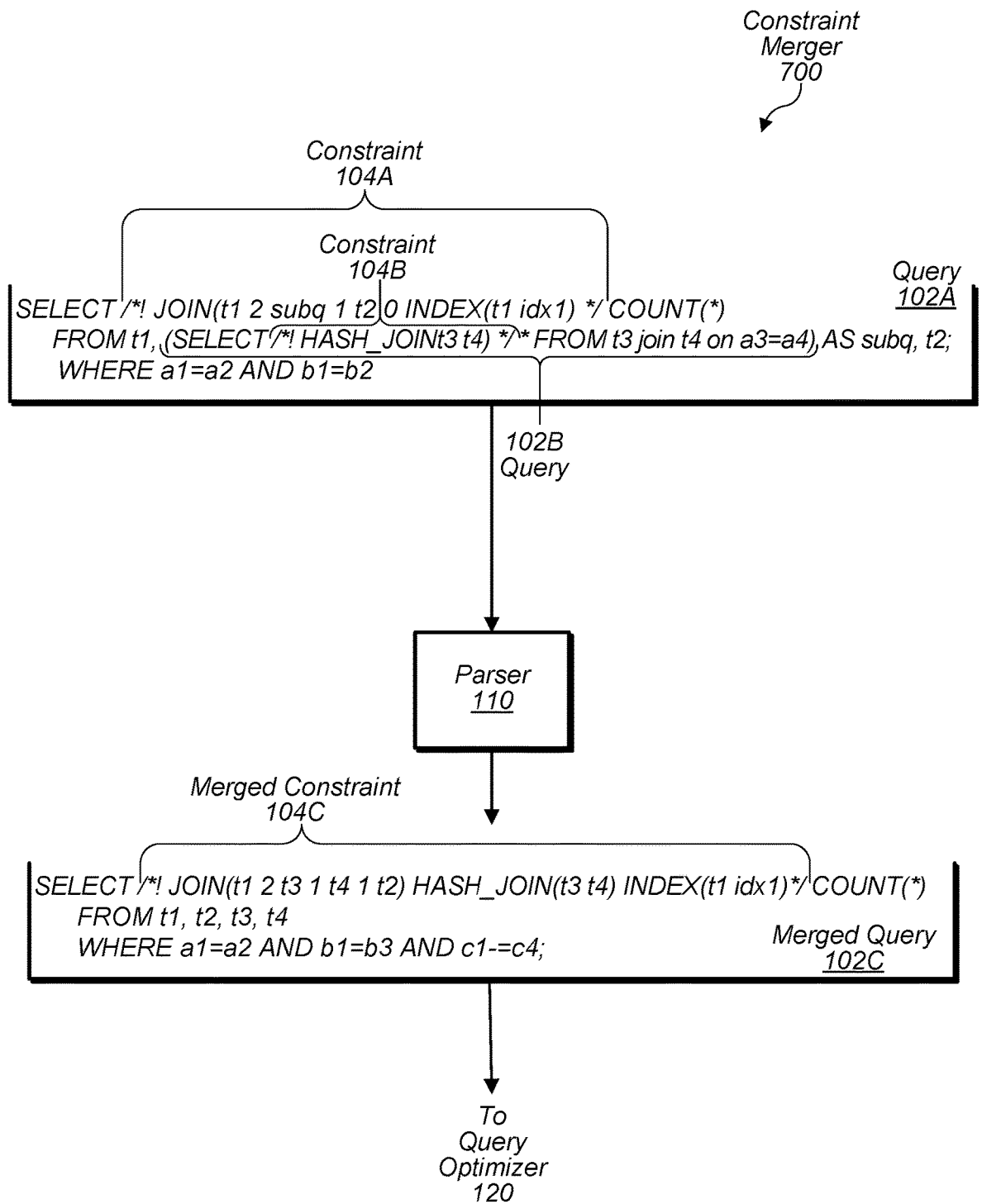
FIG. 7 is a block diagram illustrating one embodiment of a constraint merger.

Turning now to FIG. 7, a block diagram of a plan constraint merger 700 is depicted. As noted above and shown in FIG. 7, a query 102A may be received that includes another query 102B. Still further, queries 102A and 102B may include multiple constraints 104A and 104B, respectively. In the illustrated embodiment, parser 110 is operable to identify these nested queries 102 and determine whether they can be merged together. (In another embodiment, this analysis may be performed by query optimizer 120.) Based on this determination, parser 110 may produce a single merged query 102C from queries 102A and 102B as well as a single merged constraint 104C from constraints 104A and 104B.

Turning now to FIG. 8A, a flowchart of a method 800 for performing a database query is shown. In one embodiment, method 800 is performed by query optimizer of a database system such as query optimizer 120. In some instances, performance of method 800 allows greater user control and better execution plans to be potentially selected.

In step 810, a first query (e.g., query 102) including a first constraint (e.g., a constraint 104) that restricts selection of a set of execution plans (e.g., execution plans 122) available to implement the first query is received. In various embodiments, the first constraint identifies, at least, a first option (e.g., option 106A) and a second option (e.g., option 106B) to implement a clause in the first query. In some embodiments, the clause requests selection of data from the database system (e.g., the SQL SELECT in index constraint usage 200), the first option identifies a first index to be used in performing the selection, and the second option identifies a second index to be used in performing the selection. In some embodiments, the clause requests joining content from a plurality of tables in the database system (e.g., the SQL JOIN in physical join constraint usage 300), the first option is a first type of join operation (e.g., a hash join) executable to join the content, and the second option is a second type of join (e.g., a merge join) operation executable to join the content. In some embodiments, the clause requests joining content from a plurality of tables in the database system (e.g., the SQL JOIN in logical join constraint usage 400), the first option is a first ordering (e.g., ordering 404A) for joining content from the plurality of tables, and the second option is a second ordering (e.g., ordering 404B) for joining content from the plurality of tables.

In step 820, a first execution plan that includes performance of the first option and a second execution plan that includes performance of the second option are evaluated based on the first constraint.

In step 830, one of the first and second execution plans to implement the first query is selected based on the evaluating.

In step 840, execution of the selected execution plan is caused. In various embodiments, the causing includes the query optimizer providing the selected execution plan to an execution engine for execution.

In some embodiments, method 800 further includes receiving a second query including a second constraint (e.g., a parameter constraint 104), the second query requesting a join operation, and the second constraint indicating that the join operation is to be implemented with a nested loop join that uses an index. In such an embodiment, method 800 includes evaluating, based on the second constraint, execution plans that include performance of the nested loop join using the index. In some embodiments, method 800 includes receiving a second query including a second constraint (e.g., cardinality constraint 104), the second constraint identifying a cardinality of a table specified in the second query. In such an embodiment, method 800 includes evaluating a plurality of execution plans based on the identified cardinality. In some embodiments, the first query (e.g., including constraint 104A) includes a second query that includes a second constraint (e.g., constraint 104B), and method 800 includes merging the first and second queries into a single query, including merging the first and second constraints into a single constraint (e.g., merged constraint 104C). In some embodiments, method 800 includes receiving a second query including a second constraint, determining, by the query optimizer, that no execution plan satisfying the second constraint exists, and, in response to the determining, providing an indication (e.g., an error 124) that the query optimizer is not able to determine an execution plan that satisfies the second constraint. In some embodiments, method 800 further includes selecting another execution plan that does not satisfy the second constraint and causing execution of the other selected execution plan.

Turning now to FIG. 8B, a flowchart of a method 850 for performing a database query is shown. In one embodiment, method 800 is performed by query optimizer of a database capable of receiving optimizer constraints such as a database implemented by database system 10. In some instances, performance of method 800 allows greater user control and better execution plans to be potentially selected.

Method 850 begins in step 860 with receiving a first request to perform a query (e.g., query 102) of the database, the first request including a first constraint (e.g., constraint 104) that indicates a plurality of options (e.g., options 106) for implementing a portion of the query. In some embodiments, the first constraint (e.g., index constraint 104) indicates that the query is to be performed using one of at least two indexes specified in the first constraint. In some embodiments, the first constraint (e.g., physical join constraint 104) indicates that a join specified in the first request is to be performed using one of at least two physical join operations specified in the first constraint. In some embodiments, the first constraint (e.g., logical join constraint 104) indicates that a join specified in the first request is to be performed using one of at least two orderings for joining tables permitted by the first constraint. In step 870, a plurality of execution plans that include performance of at least one of the plurality of options are analyzed. In step 880, based on the analyzing, one of the plurality of execution plans is selected to implement the query. In step 890, the selected execution plan is executed to perform the query. In some embodiments, method 850 further includes receiving a second request to perform a query of the database, the second request including a second constraint and indicating (e.g., via an error 124), to a user of the database, that the second constraint cannot be satisfied.

Query Plan Overrides

In some instances, when a query optimizer selects an execution plan based on one or more query optimizer constraints, the selected execution plan may work well for implementing a given query during some circumstances but fails to work well for implementing the query during other circumstances. For example, as noted above, database system 10 may implement a multiple tenant database that stores data for multiple tenants. In some embodiments, these tenants may interact with their data using a common front-end application that issues the same set of queries 102 regardless of the tenant using the application. In this example, an execution plan selected for a query having a particular constraint might perform poorly for a tenant who has an unusual data layout or some other usual property that does not affect other tenants. While one solution might entail modifying the query defined in the program instructions of the application, a query's problematic execution may often be identified by a database system operator, who is monitoring the database system's performance and who is distinct from the developer responsible for maintain the application program instructions. Such a fix might thus be delayed for some time until the developer's help can be enlisted to push a software update. Still further, it may be desirable to maintain the existing execution plan if it performs well for other tenants.

The present disclosure describes embodiments in which a query plan override may be specified for a query to cause a query optimizer to select a different execution plan in certain circumstances such as when a query plan is known to perform poorly. As will be described below, a database system may receive a query, which may include one or more query optimizer constraints, and determine whether a corresponding override exists for the query. If an override does exist for the query and the circumstances for which the override was specified have been met (e.g., the query is being issued for a particular tenant known to have a problematic data layout), the database system may alter the set of constraints being provided to the query optimizer to cause the query optimizer to select a different execution plan based on this new set of constraints in order to avoid any issues associated with the previously selected plan. In various embodiments, the previously selected plan may still be maintained so that it can be used in circumstances in which the override is not being enforced. Furthermore, as this constraint alteration is being performed by the database system after reception of a given query, in various embodiments, an override can be provided without having to modify the original query specified in the application program instructions. Thus, the problematic execution plan associated with a given query can be addressed without having to modify the program instruction of the application—and thus potentially involve further delay.

Figure 9:
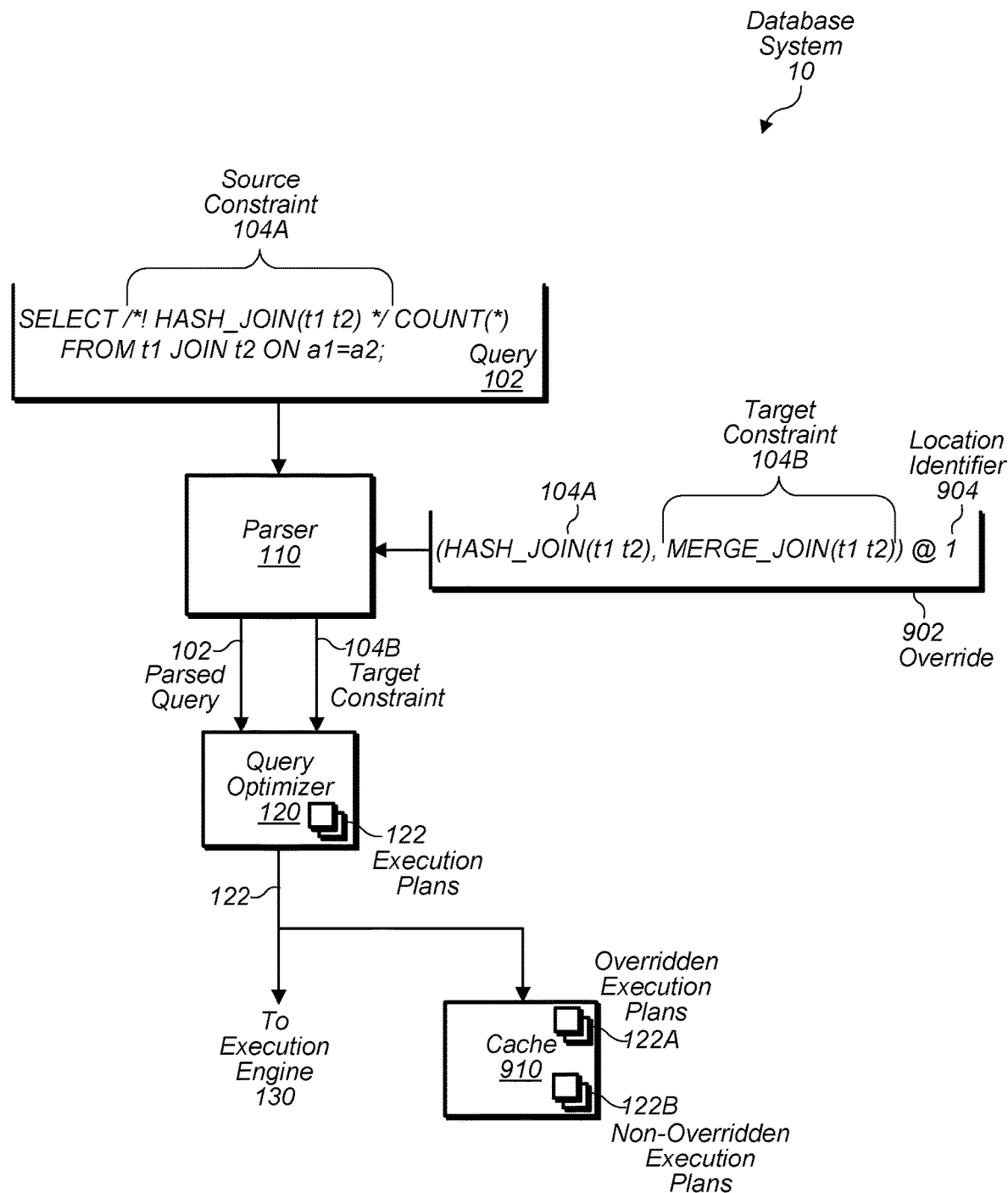
FIG. 9 is a block diagram illustrating one embodiment of a database system configured to support query plan overrides.

Turning now to FIG. 9, a block diagram of database system 10 configured to implement query plan overrides is depicted. As discussed in the section above and shown in FIG. 9, system 10 may include a parser 110 operable to parse a received query 102 including one or more constraints 104 and provide the parsed query 102 along with constraints 104 to a query optimizer 120. Query optimizer 120 may then select an execution plan 122 to implement the parsed query 102 after evaluating various execution plans 122 based on the provided constraints 104. The selected execution plan 122 may then be provided to an execution engine 130, which executes the plan 122 to implement the query 102. In the illustrated embodiment, however, parser 110 is further operable to determine, for a received query 102, whether a corresponding override 902 has been specified for the query 102 and to facilitate implementing the override 902 if the circumstances for implementing the override 902 have been met. (In other embodiments, looking up overrides 902 and/or implementing overrides 902 may be handled by one or more elements other than parser 110.)

As discuss above, overrides 902 may be specified in order to override a particular execution plan 122 selected by query optimizer 120 for a received query 102. In the illustrated embodiment, an override 902 includes a source constraint 104A and a target constraint 104B. In various embodiments, the source constraint 104A identifies the original constraint 104 present in a received query 102 to be replaced; the target constraint 104B indicates the new constraint 104 to be used to replace the source constraint 104B. Accordingly, in the example depicted in FIG. 9, the override 902 identifies a source constraint 104A of HASH_JOIN(t1 t2) is to be replaced by the target constraint 104B MERGE_JOIN(t1 t2). Thus, parser 110 may provide the target constraint 104B MERGE_JOIN(t1 t2) to cause query optimizer 120 to consider execution plans 122 that include only a merge join of tables t1 and t2 in accordance with the target constraint 104B instead of considering execution plans 122 that include only a hash join of tables t1 and t2 in accordance with the source target constraint 104A. Although not depicted, multiple source constraints 104A and/or multiple target constraints 104B may be specified in a given override 902. Also, a given override 902 may not specify any source constraints 104A (e.g., when a constraint 104 is merely being added a query 102) or may not specify any target constraints 104B (e.g., when a constraint 104 is merely being removed a query 102).

Because a source and target constraints 104A may reside at multiple possible locations in more complex queries 102, in various embodiments, an override 902 may include a location identifier 904 to indicate where constraints 104 should be altered. In the example depicted in FIG. 9, source constraint 104A can only reside at a single location in query 102; thus, location identifier 904 merely indicates a "1". In contrast, the queries 102 depicted in FIG. 7 discussed above and in FIG. 12 discussed below have multiple nested SELECT blocks, which can each have a set of one or more constraints 104. In some embodiments, location identifiers 904 are assigned to each SELECT block—thus, an override 902 may specify a location identifier 904 to identify which SELECT block is to be modified. In some embodiment discussed below with FIG. 12, location identifiers 904 are assigned to each table reference present in query 102—thus, an override 902 can specify a proximal table reference where a constraint modification is to occur. In still other embodiments, location identifiers 904 may be specified differently such identifying the location of the starting character for a constraint 104 within the query text of a query 102.

Overrides 902 may be used to add, modify, or remove any suitable constraints 104 to alter query optimizer 120's selection of an execution plan 122. For example, as discussed above with respect to FIG. 2, an override 902 may be used to replace a first index constraint 104A identifying a first index to be used in performing query 102 with a second index constraint 104B identifying a second index to be used instead of the first index in performing the query 102. As another example discussed above with respect to FIG. 3 and also with FIG. 9, an override 902 may specify that a first physical join constraint 104A indicating a first physical join operation (e.g., a hash join operation) is to be replaced by a second physical join constraint 104B indicating a second physical join operation (e.g., a merge join operation) to be used in implementing the query 102. As yet another example discussed above with respect to FIG. 4, an override 902 may specify that a first logical join constraint 104 identifying a first ordering for joining content from multiple tables be replaced with a second logical join constraint 104 identifying a second ordering for joining content from the tables. Overrides 902 may also specify parametrize constraints 104 (discussed above with FIG. 5), cardinality constraints 104 (discussed above with FIG. 6), etc.

Overrides 902 may also be specified for any of various suitable circumstances. For example, in some embodiments, a criterion for an override 902 may indicate that the override 902 is to be enforced for a query 102 only if the query 102 is issued for a particular tenant as noted above. Accordingly, if the query 102 is issued for another tenant, parser 110 may merely pass a source constraint 104A on to query optimizer 120 without any modification. In some embodiments, a criterion for an override 902 may indicate that the override 902 is to be performed for a query 102 only if the query 102 issued for a particular user of a tenant. In some embodiments in which multiple applications interface with database system and use the same query 102, a criterion for an override 902 may indicate that the override 902 is to be enforced for a query 102 only if the query 102 issued by a particular application. In some embodiments, an override 902 may be specified without any restriction when the override 902 is to be implemented. For example, a query 102 may include an index constraint 104 that identifies the wrong index (or a corrupt index). An override 902 may then be specified to correct this constraint 104 for all instances in which the query 102 is performed. In some embodiments, expiration criteria may also be specified for a given override 902 in order to make the override 902 temporary.

As will be described in greater detail below with FIG. 10, in some embodiments, overrides 902 (and their corresponding criteria) are maintained within database system 10's database catalog—although, in other embodiments, overrides 902 may be stored elsewhere (As used herein, the term "database catalog" (or merely "catalog") is to be interpreted in accordance with its established meaning, which includes the set of metadata maintained by a database system to implement a database such as schema metadata, database object definitions, function definitions, indexes, user account information, etc.) In such an embodiment, parser 110 may determining whether an override 902 has been specified for a query 102 by accessing the catalog to determine whether the catalog includes the override 902 as well as determine the criteria for when an override 902 is to be implemented. Thus, a person wanting to correct a problematic execution plan 122 can address the issue by merely updating the database catalog to add an override 902—and without having to modify the query 102 as specified in one or more program instructions of the application.

In the illustrated embodiment, once an execution plan 122 has been determined by query optimizer 120, optimizer 120 may provide the execution plan 122 to cache 910 in addition to providing the plan 122 to execution engine 130. Cache 910, in various embodiments, maintains previously determined execution plans 122 for queries 102 so that they can be reused if the queries 102 are received again—thus saving the effort of having to regenerate execution plans 122. As an override 902 for a given query 102 may be implemented only in certain circumstances (and a query 102 may have more than one override 902), cache 910 may include multiple cached plans 122 for the query 102, which may include those produced from overrides 902 shown as overridden execution plans 122A and those that do not result from overrides 902 shown as non-overridden execution plans 122B. Thus, if a given query 102 is received, performance of that query 102 can benefit from an already cached execution plan 122 regardless of whether a corresponding override 902 is being enforced for that query 102.

Figure 10:
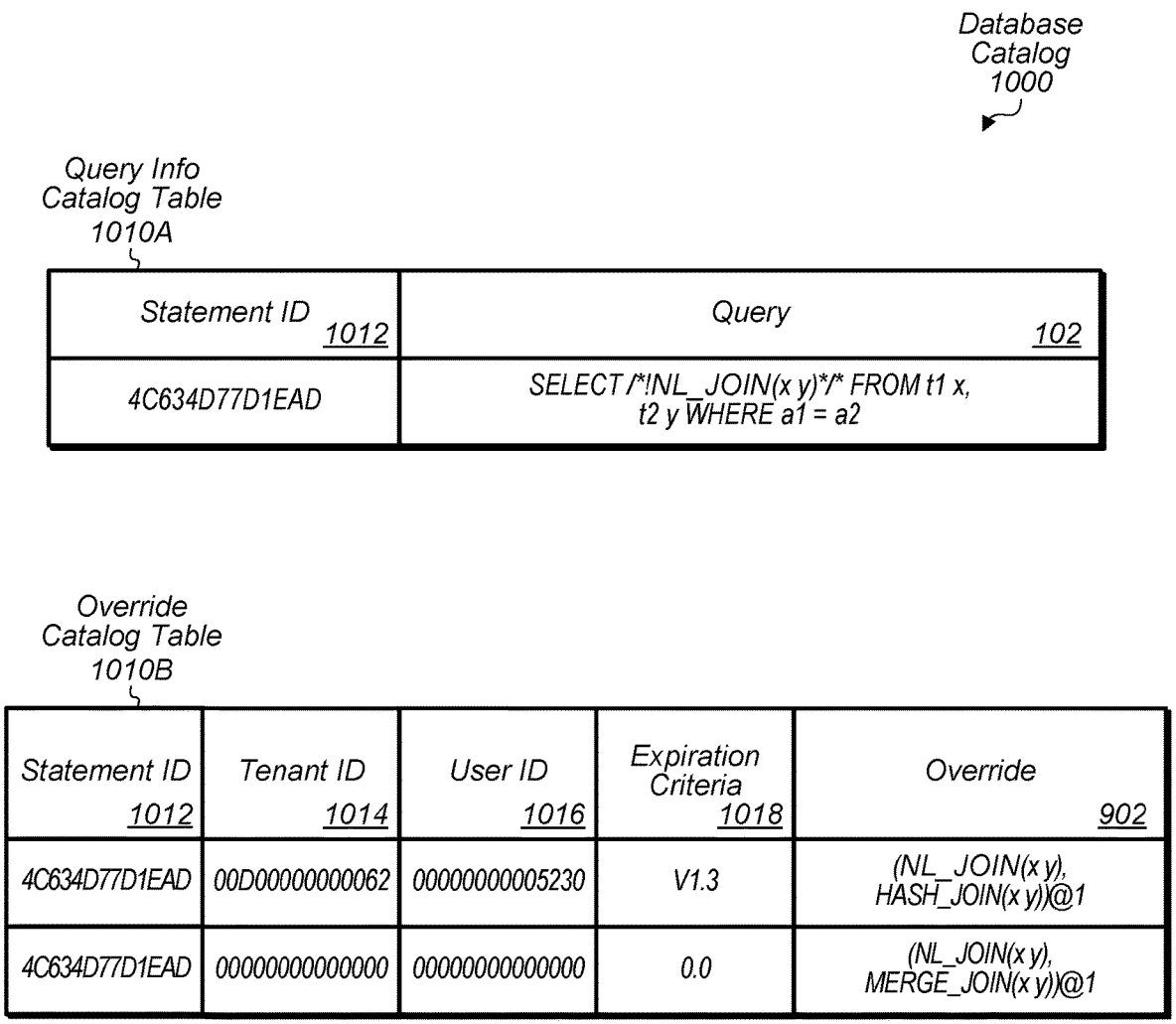
FIG. 10 is a block diagram illustrating one embodiment of catalog tables maintained by the database system to support query plan overrides.

Turning now to FIG. 10, a block diagram of a database catalog 1000 storing override information is depicted. In the illustrated embodiment, a database catalog 1000 includes query information catalog 1010A and override catalog table 1010B. Although not depicted, catalog 1000 may also include multiple other tables for implementing database system 10. In other embodiments, catalog tables 1010 may be implemented differently—e.g., more (or less) catalog tables 1010 may be used to implement overrides 902, more (or less) elements may be included in each table 1010, override information may be stored externally to catalog 1000, etc.

Query information catalog table 1010A, in various embodiments, includes various metadata about queries 102, which may have corresponding overrides 902. In the illustrated embodiment, each row in table 1010A includes the text of a particular query 102 and a corresponding statement identifier 1012, which is a unique value assigned to the particular query 102 to distinguish it from other queries. For example, as shown, the query 102 SELECT/*!NL_JOIN(x y)*/*FROM t1 x, t2 y WHERE a1=a2 may be assigned the statement identifier 1012 4C634D77D1EAD, which may be used to look up what overrides 902 (if any) have been specified for that query 102 in table 1010B. In some embodiments, query information catalog table 1010A may include additional metadata such as various history information about when the query 102 has been issued, how frequently it has been issued, performance metrics about the query 102's implementation, etc.

Override catalog table 1010B, in various embodiments, includes various metadata about overrides 902. In the illustrate embodiment, each row in table 1010B includes the text of the override 902 as well as the relevant statement identifier 1012, tenant identifier 1014, user identifier 1016, and expiration criteria 1018.

Tenant identifiers 1014, in various embodiments, are unique identifiers that are assigned to each tenant in order to distinguish one tenant from another. In the illustrated embodiment, tenant identifiers 1014 are specified in a given row of table 1010B to indicate that a criterion of that row's override 902 is a query 102 being issued for the particular tenant having that tenant identifier 1014. Accordingly, in the example depicted in FIG. 10, if query 102 having the statement identifier 1012 4C634D77D1EAD is received for a tenant having the identifier 1014 00D00000000062, the override 902 (NL_JOIN(x y), HASH_JOIN(x y))@1 is applied. In the illustrated embodiment, a row having a tenant identifier 1014 of all zeros (such as in the second row of table 1010B) indicates that the corresponding override 902 is to be applied for all tenants other than those having overrides 902 specified specifically for them. Accordingly, the override 902 identified in the second row of table 1000B would not be applied for the tenant having tenant identifier 1014 00D00000000062 since that tenant already has a corresponding override 902 specified for it.

User identifiers 1016, in various embodiments, are unique identifiers that are assigned to each user in order to distinguish one user from another. Similar to identifiers 1014, in the illustrated embodiment, user identifiers 1016 are specified in a given row of table 1010B to indicate that a criterion of that row's override 902 is a query 102 being issued for the particular user having that user identifier 1016. Accordingly, in the example depicted in FIG. 10, if query 102 having the statement identifier 1012 4C634D77D1EAD is received for a user having the identifier 1016 00000000005230, the override 902 (NL_JOIN(x y), HASH_JOIN(x y))@1 is to applied. Similar to identifiers 1014, in the illustrated embodiment, a row having a user identifier 1016 of all zeros indicates that the corresponding override 902 is to be applied for all users other than those having overrides 902 specified specifically for them.

Expiration criteria 1018, in various embodiments, identify one or more criteria for when an override 902 is to expire—i.e., is no longer to be enforced. In the illustrated embodiment, expiration criteria 1018 is expressed as a version identifier of the application issues queries 102. In the example depicted in FIG. 10, the override 902 is valid for version 1.3 of the application issuing queries 102 but is not applicable for later or earlier versions of the application. In the illustrated embodiment, a value of 0.0 indicates that no expiration criteria 1018 has been specified for the corresponding override 902. In other embodiments, criteria 1018 may be specified differently such as an expiration date, a version associated with database system 10, an epoch number, etc.

Figure 11:
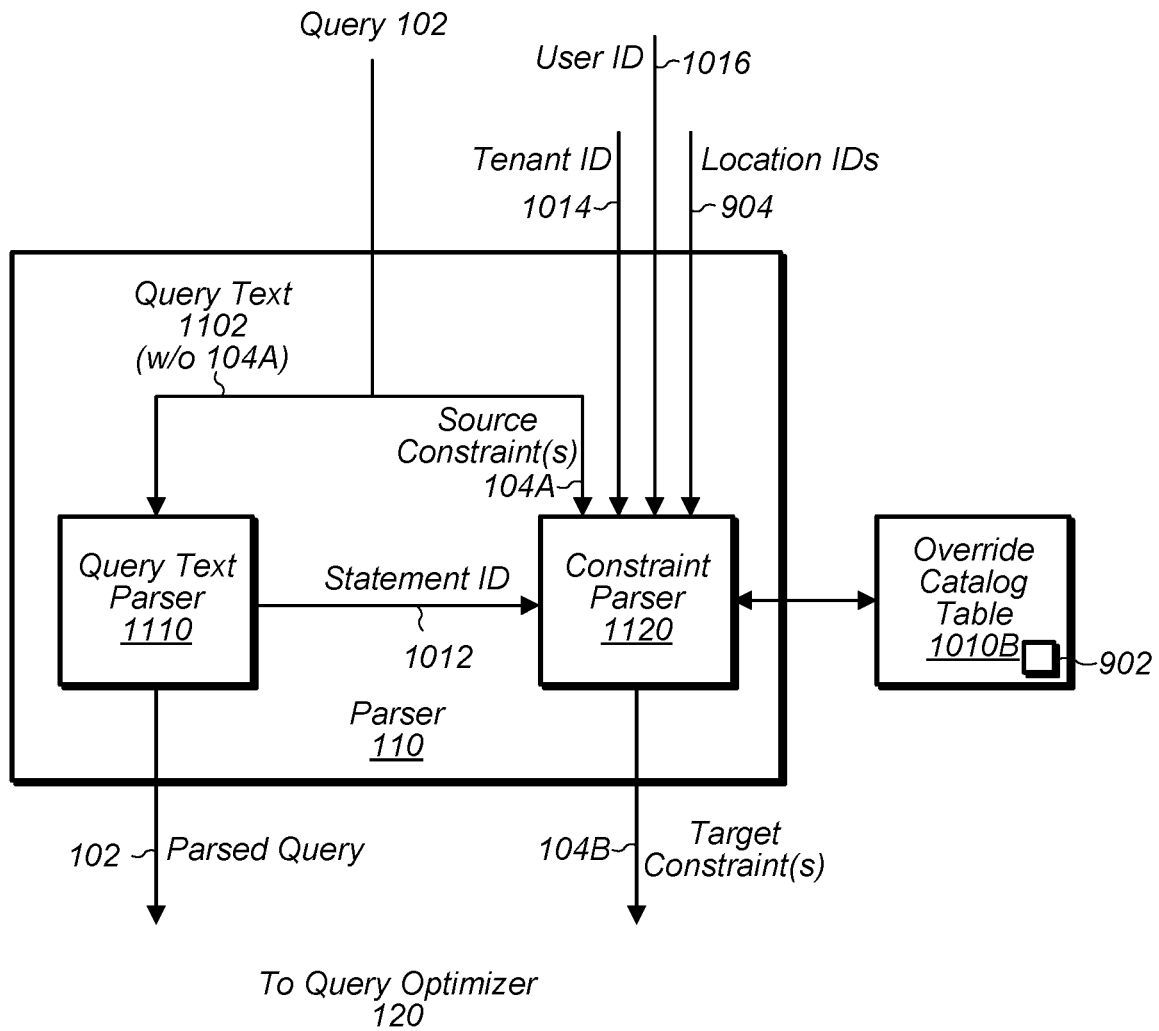
FIG. 11 is a block diagram illustrating one embodiment of a query parser of the database system.

Turning now to FIG. 11, a block diagram of parser 110 is depicted. As noted above, in various embodiments, parser 110 handles parsing of a received query 102 for database system 10. In the illustrated embodiment, parser 110 uses a query language parser 1110 and a separate constraint parser 1120 to facilitate this parsing. In other embodiments, however, parser 110 may be implemented differently.

Query text parser 1110, in various embodiments, parses the query text 1102 of a received query 102, which may be separated from the constraints 104 included the query 102. As noted above, this may entail performing a syntax analysis of the clauses within a query 102 and assembling a data structure (e.g., an expression tree) that can be processed by query optimizer 120. In some embodiments, parser 1110 supports SQL; however, in other embodiments, other query declarative languages may be supported.

Constraint parser 1120, in various embodiments, parses received constraints 104 and determines whether any corresponding overrides 902 have been specified. To facilitate looking up overrides 902, constraint parser 1120 may receive various metadata, which, in the illustrated embodiment, includes a tenant identifier 1014, user identifier 1016, and location identifier 904 for a received query 102. In the illustrated embodiment, parser 1120 also receives statement identifier 1012 for parser 1110, which may handle the lookup of the identifier 1012 in table 1100A based on query text 1102—although parser 1120 may alternatively receive the query text 1102 to look up the corresponding statement identifier 1012 in another embodiment. In some embodiments, metadata, such as tenant identifier 1020, user identifier 1030, may be provide by the application issuing query 102; however, in other embodiments, this metadata may be provided from some other source such as one or more elements in database system 10. Based on the received metadata 1012-1016, constraint parser 1120 may access override catalog table 1010B to determine whether an override 902 has been specified that matches the metadata 1012-1016. If such an override 902 exists, parser 1120 may examine the received source constraints 104A and their corresponding location identifiers 904 to determine whether those elements 104A and 904 match those present in the override 902. Based on this comparison, parser 1120 may then replace the source constraints 104A with the target constraints 104B, which are then provided by parser 1120 to query optimizer 120.

Figure 12:
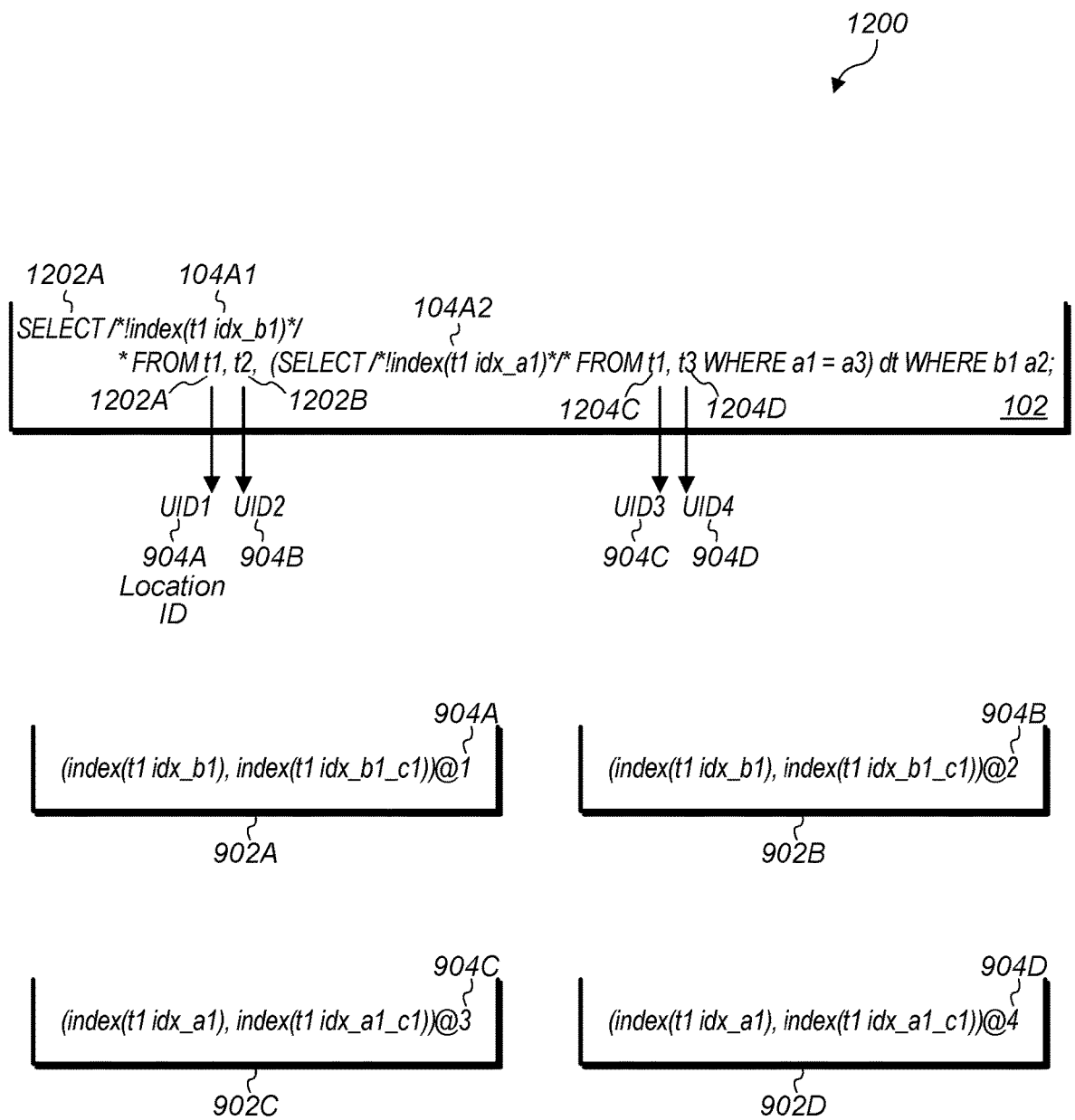
FIG. 12 is a diagram illustrating an example of using location identifiers to facilitate overriding multiple query optimizer constraints.

Turning now to FIG. 12, an example 1200 of using location identifiers 904 is depicted. As noted above, in some embodiments, location identifiers 904 may be used to identify where constraints 104 should be modified as a given query 102 may have multiple different locations where constraints 104 can potentially reside. In the illustrated embodiment, location identifiers 904 are assigned to each table reference 1202 as constraints 104 may be collocated with these references 1202. For example, as shown, a location identifier 904A shown as unique identifier (UID) 1 may be assigned to the table reference 1202A of table t1, location identifier 904B shown as UID2 may be assigned to the table reference 1202B of table t2, and so forth. In some embodiments, this manner of assigning locations identifiers 904 may be used as the depicted UIDs may already be generated by another element of database system 10 such as execution engine 130, which, in some embodiments, may generate these location identifiers 904 when an execution plan 122 is run for the first time.

In the example depicted in FIG. 12, the query 102 includes a first constraint 104A1 near location table references 1202A and 1202B and thus associated with location identifiers 904A and 904B. In the illustrated embodiment, an override 902 wanting to alter constraint 104A1 can reference either location identifier 904A or location identifier 904B as shown in overrides 902A and 902B, respectively. As also depicted in the example, the query 102 also includes a second constraint 104A2 near location table references 1202C and 1202D and thus associated with location identifiers 904C and 904D. An override 902 wanting to alter constraint 104A2 can similarly reference either location identifier 904C or location identifier 904D as shown in overrides 902C and 902D, respectively. In other embodiments, location identifiers 904 may be assigned and/or implemented differently as noted above.

Figures 13A, 13B:
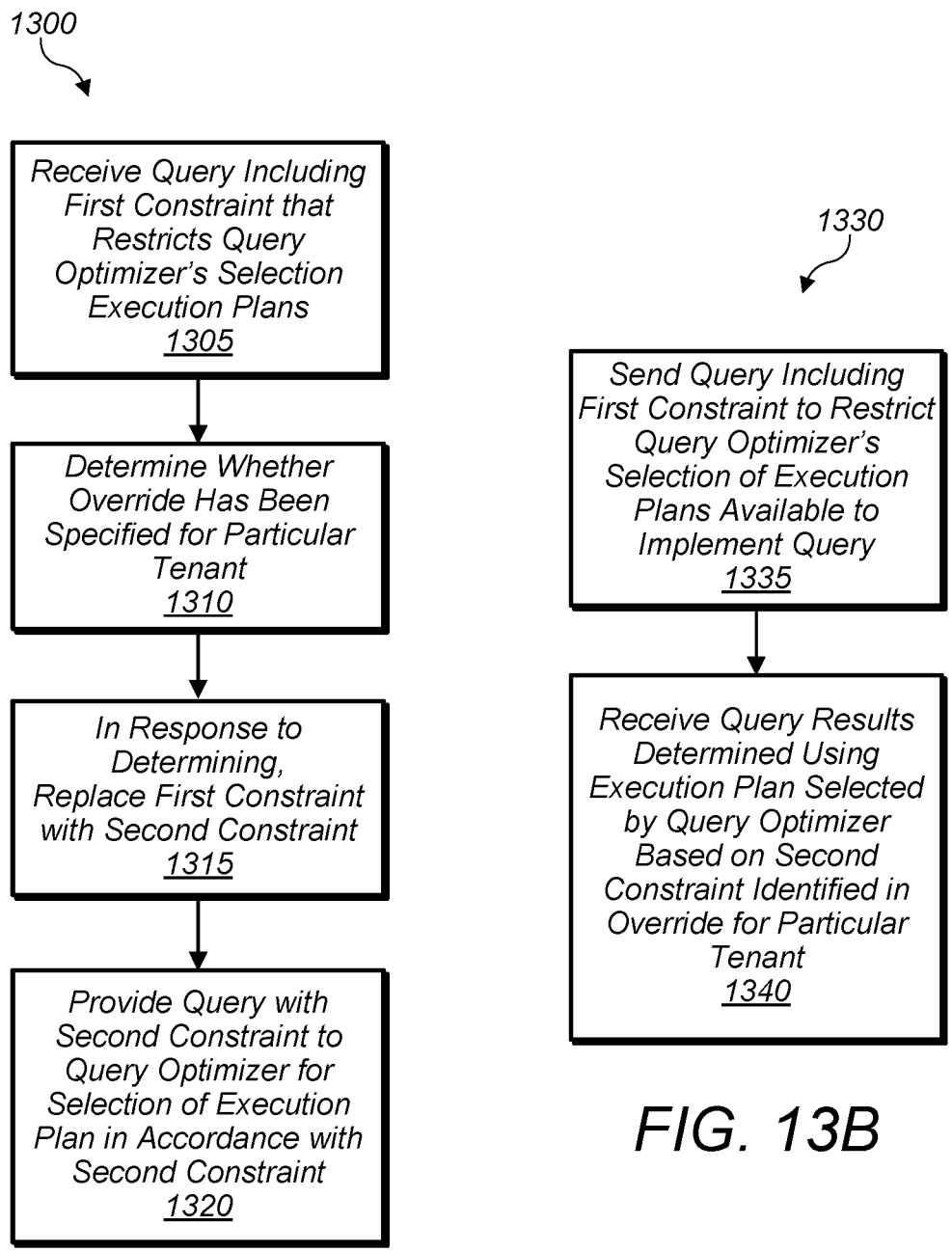

Turning now to FIG. 13A, a flowchart of a method 1300 for performing a database query based on an override is shown. Method 1300 is one embodiment of a method performed by a computer system implementing a database system that supports query plan overrides such as database system 10. In some instances, performance of method 1300 may result in improved performance when servicing queries having query optimizer constraints that, for example, produce undesirable results.

In step 1305, a query (e.g., query 102) requesting data (e.g., in data tables 140A) from a multi-tenant database is receiving at a query parser (e.g., parser 110) of a database system. In various embodiments, the query includes a first constraint (e.g., source constraint 104A in FIG. 9) that restricts a query optimizer's (e.g., query optimizer 120's) selection of a set of execution plans (e.g., execution plans 122) available to implement the query.

In step 1310, the database system determines whether an override (e.g., override 902) has been specified for a particular tenant associated with the query. In various embodiments, the override indicates that the first constraint is to be replaced with a second constraint (e.g., target constraint 104B in FIG. 9) for the particular tenant. In some embodiments, the first constraint identifies a first index to be used in performing the query (e.g., index constraint 104 in FIG. 2), and the second constraint identifies a second index to be used instead of the first index in performing the query. In some embodiments, the first constraint indicates that a join specified in the query is to be performed using a first physical join operation (e.g., physical join constraint 104 in FIG. 3), and the second constraint indicates that the join specified in the query is to be performed using a second physical join operation instead of the first physical join operation. In various embodiments, determining whether the override has been specified for the particular tenant includes accessing a catalog (e.g., catalog 1000) of the multi-tenant database to determine whether the catalog includes the override. In some embodiments, a first identifier of the particular tenant (e.g., tenant identifier 1014) is received with the query, and the accessing includes using the first identifier to query a table (e.g., override catalog table 1010B) in the catalog to determine whether the override has been specified for the particular tenant. In some embodiments, a second identifier indicating a particular user (e.g., user identifier 1016) of the particular tenant is received with the query, and the accessing includes using the second identifier to query the table in the catalog to determine whether the override has been specified for the particular user. In some embodiments, accessing the catalog includes reading expiration criteria (e.g., expiration criteria 1018) for the override from the catalog, and the determining includes determining, based on the expiration criteria, whether the override has expired.

In step 1315, in response to determining that the override has been specified for the particular tenant, the database system replaces the first constraint with the second constraint. In various embodiments, the query is received from an application, and the replacing does not modify the query as specified in one or more program instructions of the application. In some embodiments, location identifier (e.g., location identifier 904) is received indicating a location of the first constraint within the query, and accessing a table in the catalog to determine whether the override has been specified for the location indicated by the location identifier.

In step 1320, the database system provides the query with the second constraint to the query optimizer for selection of an execution plan in accordance with the second constraint. In some embodiments, in response to the query optimizer selecting the execution plan in accordance with the second constraint, the selected execution plan is stored in a cache (e.g., cache 920) of the database system for servicing a subsequently received instance of the query associated with the particular tenant.

Turning now to FIG. 13B, a flowchart of a method 1330 for performing a database query based on an override is shown. Method 1330 is one embodiment of a method performed by an application querying a database system supporting query plan overrides. In some instances, performance of method 1330 may result in improved performance when servicing queries having query optimizer constraints that, for example, produce undesirable results.

In step 1335, the application sends a query (e.g., query 102) requesting data for a particular tenant from a multi-tenant database, the query including a first constraint (e.g., source constraint 104A in FIG. 9) to restrict a query optimizer's (e.g., query optimizer 120's) selection of a set of execution plans (e.g., execution plans 122) available to implement the query.

In step 1340, the application receives query results determined using an execution plan selected by the query optimizer based on a second constraint (e.g., target constraint 104B in FIG. 9) identified in an override (e.g., override 902) for the particular tenant, the override indicating that that the first constraint is to be replaced with the second constraint when servicing the query for the particular tenant. In some embodiments, the first constraint specifies a first ordering (e.g., partial ordering 402) for joining content from a plurality of tables in the multi-tenant database, and the second constraint specifies a second ordering for joining content from the plurality of tables in the multi-tenant database. In some embodiments, the query is parsed by a query parser (e.g., parser 110) that, based on the override, replaces the first constraint with the second constraint. In some embodiments, the query parser accesses a catalog (e.g., catalog 1000) of the multi-tenant database to determine whether the override has been specified for the particular tenant. In some embodiments, the application sends an indication of a current user (e.g., user identifier 1016) associated with the query, the indication being usable by the query parser to determine that the override has been specified for the current user.

Figure 13C:
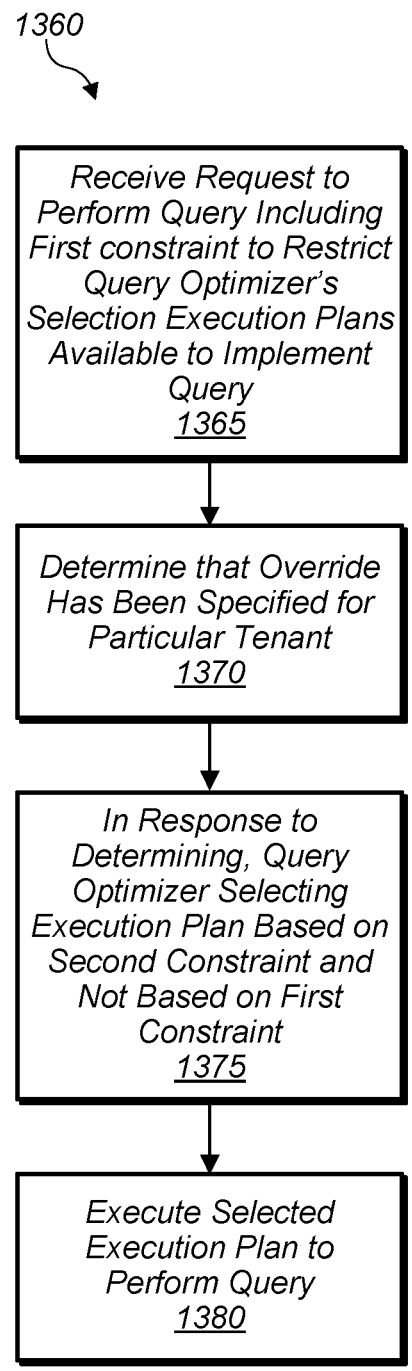

Turning now to FIG. 13C, a flowchart of a method 1360 for performing a database query based on an override is shown. Method 1360 is one embodiment of a method performed by a computer system implementing a database system that supports query plan overrides such as system 10. In some instances, performance of method 1360 may result in improved performance when servicing queries having query optimizer constraints that, for example, produce undesirable results.

In step 1365, a request is received to perform a query (e.g., query 102) for a particular tenant of a multi-tenant database, the request including a first constraint (e.g., source constraint 104A in FIG. 9) to restrict a query optimizer's (e.g., query optimizer 120's) selection of execution plans (e.g., execution plans 122) available to implement the query.

In step 1370, a determination is made that an override (e.g., override 902) has been specified for the particular tenant, the override indicating that the first constraint is to be replaced with a second constraint (e.g., target constraint 104B in FIG. 9). In some embodiments, the determining includes accessing a table (e.g., override catalog table 1010B) in a database catalog of the multi-tenant database, the table being operable to store one or more overrides for tenants of the multi-tenant database. In some embodiments, the determining includes determining whether the override has expired based on expiration criteria (e.g., expiration criteria 1018) stored for the override.

In step 1375, in response to the determining, the query optimizer selects an execution plan based on the second constraint and not based on the first constraint. In some embodiments, a query parser (e.g., parser 110) replaces the first constraint with the second constraint and provides the second constraint to the query optimizer to facilitate selecting the execution plan.

In step 1380, the selected execution plan is executed (e.g., by execution engine 130) to perform the query. In some embodiments, method 1360 includes storing, in a cache (e.g., cache 910), the selected execution plan to facilitate a subsequent performance of the query for the particular tenant and storing, in the cache, another execution plan selected by the query optimizer based on the first constraint to facilitate a subsequent performance of the query for a tenant other than the particular tenant.

Exemplary Computer System

Turning now to FIG. 14, a block diagram of an exemplary computer system 1400, which may implement database system 10, is depicted. Computer system 1400 includes a processor subsystem 1480 that is coupled to a system memory 1420 and I/O interfaces(s) 1440 via an interconnect 1460 (e.g., a system bus). I/O interface(s) 1440 is coupled to one or more I/O devices 1450. Computer system 1400 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1400 is shown in FIG. 14 for convenience, system 1400 may also be implemented as two or more computer systems operating together.

Processor subsystem 1480 may include one or more processors or processing units. In various embodiments of computer system 1400, multiple instances of processor subsystem 1480 may be coupled to interconnect 1460. In various embodiments, processor subsystem 1480 (or each processor unit within 1480) may contain a cache or other form of on-board memory.

System memory 1420 is usable store program instructions executable by processor subsystem 1480 to cause system 1400 perform various operations described herein. System memory 1420 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1400 is not limited to primary storage such as memory 1420. Rather, computer system 1400 may also include other forms of storage such as cache memory in processor subsystem 1480 and secondary storage on I/O Devices 1450 (e.g., a hard drive, storage array, etc.). In some embodiments, these other forms of storage may also store program instructions executable by processor subsystem 1480. In some embodiments, portions of database system 10 described above may include (or be included within) system memory 1420.

I/O interfaces 1440 may be any of various types of interfaces configured to couple to and communicate with other devices, according to various embodiments. In one embodiment, I/O interface 1440 is a bridge chip (e.g., Southbridge) from a front-side to one or more back-side buses. I/O interfaces 1440 may be coupled to one or more I/O devices 1450 via one or more corresponding buses or other interfaces. Examples of I/O devices 1450 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1400 is coupled to a network via a network interface device 1450 (e.g., configured to communicate over Wi-Fi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored thereon that are capable of causing a query parser of a database system to perform operations comprising:
receiving, from an application, a first instance of a query requesting data from a multi-tenant database for a first entity, wherein the query includes a constraint that restricts how a query optimizer implements a clause within the query;
in response to determining that a query override has been specified for the first entity, providing a modified version of the query that has a modified version of the constraint to the query optimizer for selection of a first execution plan;
receiving, from the application, a second instance of the query requesting data from the multi-tenant database for a second entity; and
in response to determining that no query override has been specified for the second entity, providing the query, without modification, to the query optimizer for selection of a second, different execution plan.

2. The computer readable medium of claim 1, wherein the modified version of the query replaces a first constraint of the query with a second constraint, and wherein creating the modified version does not modify the query as specified in one or more program instructions of the application.

3. The computer readable medium of claim 1, wherein the query identifies a first index to be used in performing the query; and
wherein the modified version of the query identifies a second index to be used instead of the first index in performing the query.

4. The computer readable medium of claim 1, wherein the query indicates that a join specified in the query is to be performed using a first physical join operation; and
wherein the modified version of the query indicates that the join specified in the query is to be performed using a second physical join operation instead of the first physical join operation.

5. The computer readable medium of claim 1, wherein determining that a query override has been specified for the first entity includes:
accessing a catalog of the multi-tenant database to determine whether the catalog indicates the override.

6. The computer readable medium of claim 5, wherein the operations further comprise:
receiving, with the query, first identifier information indicating that the first entity is associated with a first tenant; and
wherein the accessing includes using the first identifier information to query a table in the catalog to determine whether the override has been specified for the first tenant.

7. The computer readable medium of claim 5, wherein the operations further comprise:
receiving, with the query, second identifier information indicating that the first entity is a particular user of a first tenant; and
wherein the accessing includes using the second identifier information to query a table in the catalog to determine whether the override has been specified for the particular user of the first tenant.

8. The computer readable medium of claim 5, wherein accessing the catalog includes reading expiration criteria for the override from the catalog; and
wherein the determining includes determining, based on the expiration criteria, whether the override has expired.

9. The computer readable medium of claim 1, wherein the operations further comprise:
in response to the query optimizer selecting the first execution plan in accordance with the modified version of the constraint, storing the first execution plan in a cache of the database system for servicing a subsequently received instance of the query associated with the first entity.

10. A method, comprising:
sending, by an application to a query parser, a first instance of a query requesting data for a first entity from a multi-tenant database, wherein the query includes a constraint that restricts how a query optimizer implements a clause within the query;
receiving, by the application, first query results for the first instance of the query, wherein the first query results are determined using a modified version of the query and a first execution plan selected by the query optimizer, wherein the modified version of the query is selected in response to determining that an override to modify the constraint is specified for the first entity;
sending, by the application to the query parser, a second instance of the query requesting data for a second entity from the multi-tenant database; and
receiving, by the application, second query results for the second instance of the query, wherein the second query results are determined using the query, without modification, and a second execution plan selected by the query optimizer, wherein the query is used in response to determining that no query override has been specified for the second entity.

11. The method of claim 10, wherein the query specifies a first ordering for joining content from a plurality of tables in the multi-tenant database, and wherein the modified version of the query specifies a second ordering for joining content from the plurality of tables in the multi-tenant database.

12. The method of claim 10, wherein the modified version of the query includes replacing a first constraint of the query with a second constraint.

13. The method of claim 10, wherein the first instance of the query includes first identifier information indicating that the first entity is associated with a first tenant, and wherein determining that an override is specified for the first entity includes the query parser using the first identifier information to access a catalog of the multi-tenant database to determine whether an override has been specified for the first tenant.

14. The method of claim 10, wherein the first instance of the query includes second identifier information indicating that the first entity is a particular user of a first tenant, and wherein determining that an override is specified for the first entity includes the query parser using the second identifier information to access a catalog of the multi-tenant database to determine whether an override has been specified for the particular user of the first tenant.

15. A computer system, comprising:
one or more processors;
memory having program instructions stored therein that are executable by the one or more processors to implement a database system performing operations including:
   receiving, at a query parser of the database system from an application, a first instance of a query requesting data from a multi-tenant database for a first entity, wherein the query includes a constraint that restricts how a query optimizer implements a clause within the query;
   in response to determining that a query override has been specified for the first entity, providing a modified version of the query that a modified version of the constraint to the query optimizer for selection of a first execution plan;
   receiving, at the query parser from the application, a second instance of the query requesting data from the multi-tenant database for a second entity; and
   in response to determining that no query override has been specified for the second entity, providing the query, without modification, to the query optimizer for selection of a second, different execution plan.

16. The computer system of claim 15, wherein determining whether a query override is specified for a particular entity includes:
   accessing a table in a database catalog of the multi-tenant database, wherein the table is operable to store one or more override specifications for entities of the multi-tenant database.

17. The computer system of claim 15, wherein determining whether a query override is specified for a particular entity includes:
   determining whether the override has expired based on expiration criteria stored for the override.

18. The computer system of claim 15, wherein the operations further comprise:
   storing, in a cache, the first execution plan to facilitate a subsequent performance of the query for the first entity.

19. The computer system of claim 15, wherein the operations further comprise:
   receiving, with the first instance of the query, first identifier information indicating that the first entity is associated with a first tenant; and
   wherein determining that a query override has been specified for the first entity includes accessing the database using the first identifier information to determine that an override has been specified for users of the first tenant.

20. The computer system of claim 15, wherein the operations further comprise:
   receiving, with the first instance of the query, second identifier information indicating that the first entity is a particular user of a first tenant; and
   wherein determining that a query override has been specified for the first entity includes accessing the database using the second identifier information to determine that an override has been specified for the particular user of the first tenant.

* * * * *